(12) United States Patent
Tanaka

(10) Patent No.: US 8,780,083 B2
(45) Date of Patent: Jul. 15, 2014

(54) COORDINATE INPUT APPARATUS, CONTROL METHOD THEREOF, AND PROGRAM

(75) Inventor: Atsushi Tanaka, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 1457 days.

(21) Appl. No.: 11/836,266

(22) Filed: Aug. 9, 2007

(65) Prior Publication Data
US 2008/0291164 A1 Nov. 27, 2008

(30) Foreign Application Priority Data
Aug. 22, 2006 (JP) .................. 2006-225747

(51) Int. Cl.
*G06F 3/042* (2006.01)

(52) U.S. Cl.
USPC ........ 345/175; 345/173; 345/176; 178/18.01; 178/18.09; 178/19.01

(58) Field of Classification Search
USPC ............... 345/175, 173; 178/18.01–20.04
See application file for complete search history.

(56) References Cited

U.S. PATENT DOCUMENTS

| | | | |
|---|---|---|---|
| 4,507,557 A | 3/1985 | Tsikos | |
| 6,081,260 A * | 6/2000 | Kuzunuki et al. ............. | 345/173 |
| 6,100,538 A * | 8/2000 | Ogawa ..................... | 250/559.29 |
| 6,421,042 B1 * | 7/2002 | Omura et al. ................. | 345/157 |
| 6,498,602 B1 * | 12/2002 | Ogawa ......................... | 345/173 |
| 6,947,032 B2 * | 9/2005 | Morrison et al. ............. | 345/173 |
| 7,274,356 B2 * | 9/2007 | Ung et al. ..................... | 345/158 |
| 7,443,387 B2 * | 10/2008 | Tanaka et al. ................. | 345/173 |
| 7,525,536 B2 * | 4/2009 | Kobayashi ..................... | 345/173 |
| 7,589,715 B2 * | 9/2009 | Tanaka et al. ................. | 345/175 |
| 7,599,520 B2 * | 10/2009 | Dempski et al. ............... | 382/103 |
| 2004/0178993 A1 * | 9/2004 | Morrison et al. ............. | 345/173 |
| 2005/0078095 A1 * | 4/2005 | Ung et al. ..................... | 345/175 |
| 2005/0200612 A1 * | 9/2005 | Tanaka et al. ................. | 345/175 |
| 2006/0012579 A1 * | 1/2006 | Sato ............................. | 345/173 |
| 2006/0232568 A1 * | 10/2006 | Tanaka et al. ................. | 345/175 |

FOREIGN PATENT DOCUMENTS

| | | |
|---|---|---|
| JP | 2896183 | 3/1999 |
| JP | 2000-105671 | 4/2000 |
| JP | 2001-142642 | 5/2001 |
| JP | 2002-055770 | 2/2002 |
| JP | 2003-303046 | 10/2003 |
| JP | 2004-069483 | 3/2004 |

\* cited by examiner

*Primary Examiner* — Gregory J Tryder

(74) *Attorney, Agent, or Firm* — Cowan, Liebowitz & Latman, P.C.

(57) ABSTRACT

A plurality of sensors for receiving arrival light detect the change ranges of light amount distributions generated upon the pointing operation of a pointer on a coordinate input region. Coordinate values corresponding to the change ranges are calculated on the basis of the number of change ranges in the respective sensors and the number of pen-down signals obtained from the pointer.

6 Claims, 32 Drawing Sheets

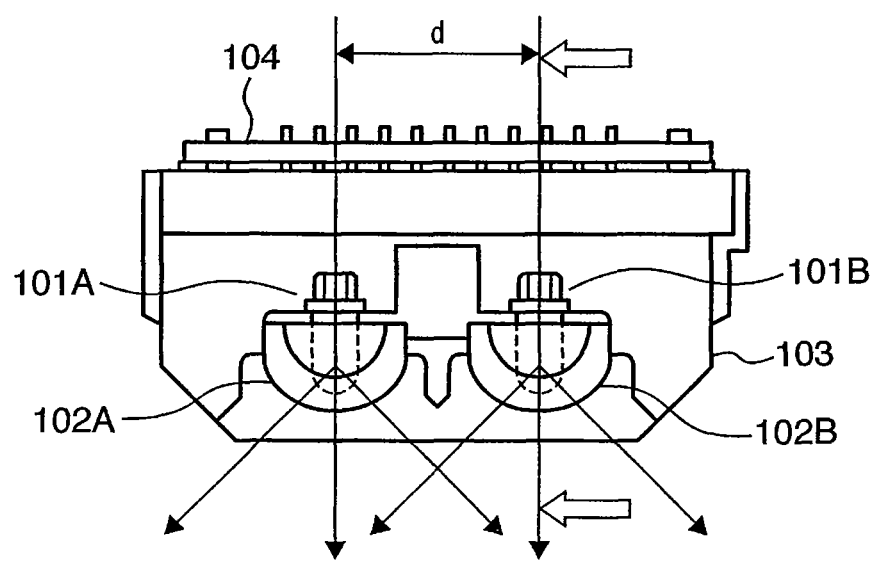
F I G. 3A

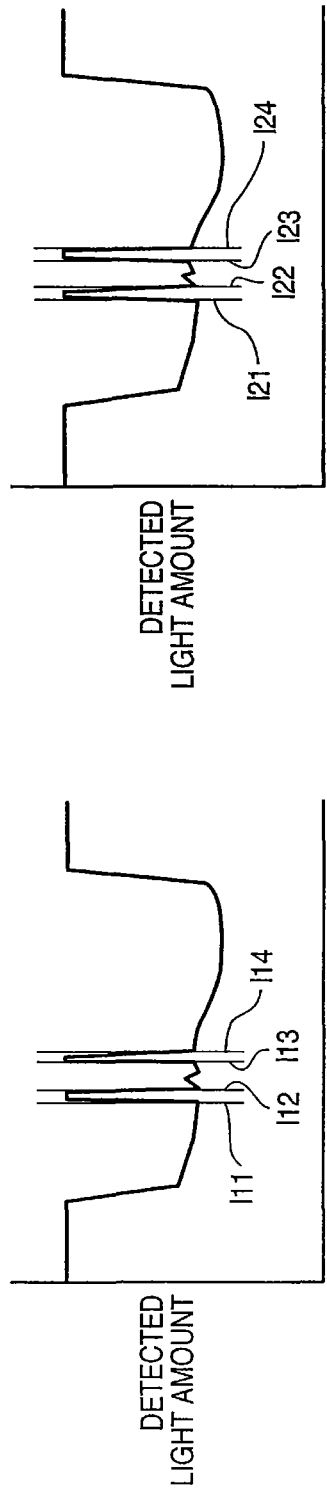
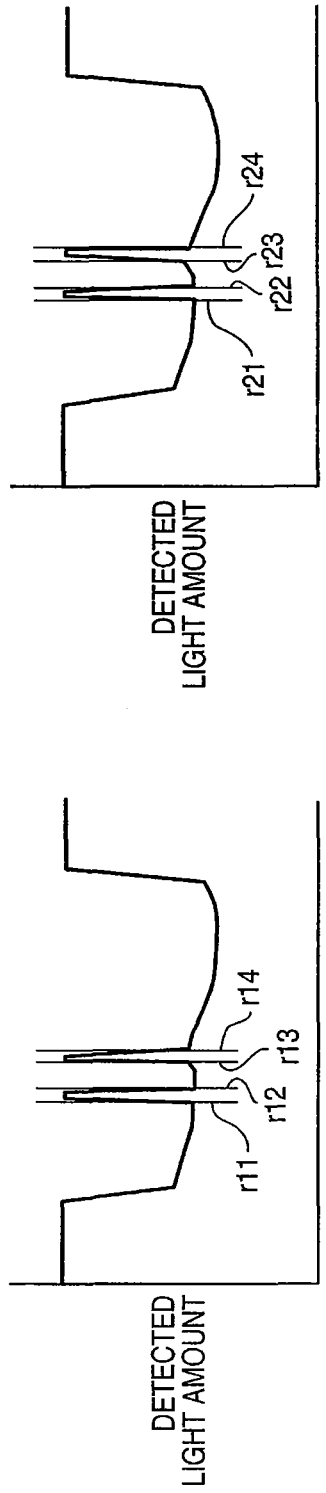
FIG. 10A  FIG. 10B  FIG. 10C  FIG. 10D

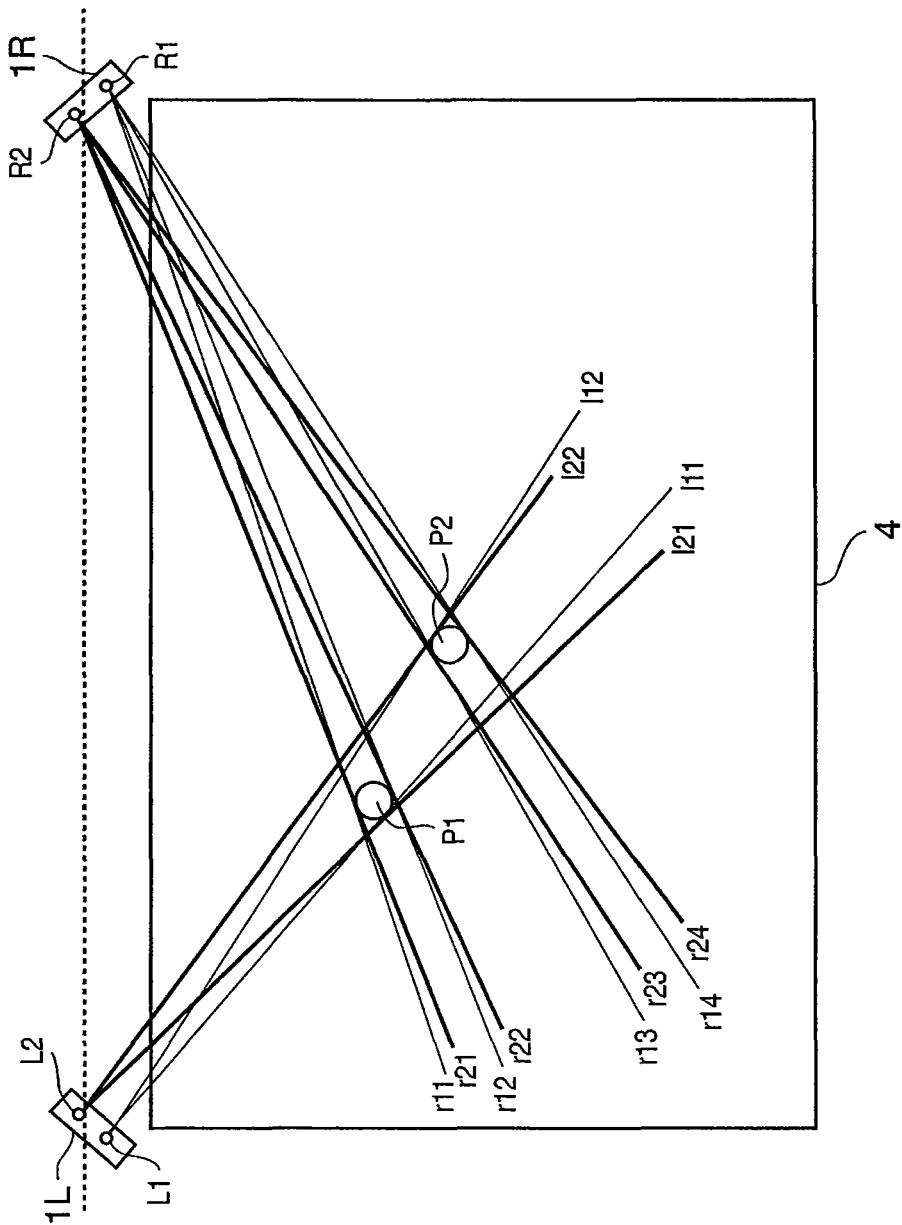

FIG. 20

|  | L1 | L2 | R1 | R2 |
|---|---|---|---|---|
| NO INPUT | 0 | 0 | 0 | 0 |
| SINGLE POINT INPUT | 1 | 1 | 1 | 1 |
| MULTIPLE POINT INPUT | 1 | 1 | 1 | 2 |
|  | 1 | 1 | 2 | 1 |
|  | 1 | 1 | 2 | 2 |
|  | 1 | 2 | 1 | 1 |
|  | 1 | 2 | 1 | 2 |
|  | 1 | 2 | 2 | 1 |
|  | 1 | 2 | 2 | 2 |
|  | 2 | 1 | 1 | 1 |
|  | 2 | 1 | 1 | 2 |
|  | 2 | 1 | 2 | 1 |
|  | 2 | 1 | 2 | 2 |
|  | 2 | 2 | 1 | 1 |
|  | 2 | 2 | 1 | 2 |
|  | 2 | 2 | 2 | 1 |
|  | 2 | 2 | 2 | 2 |

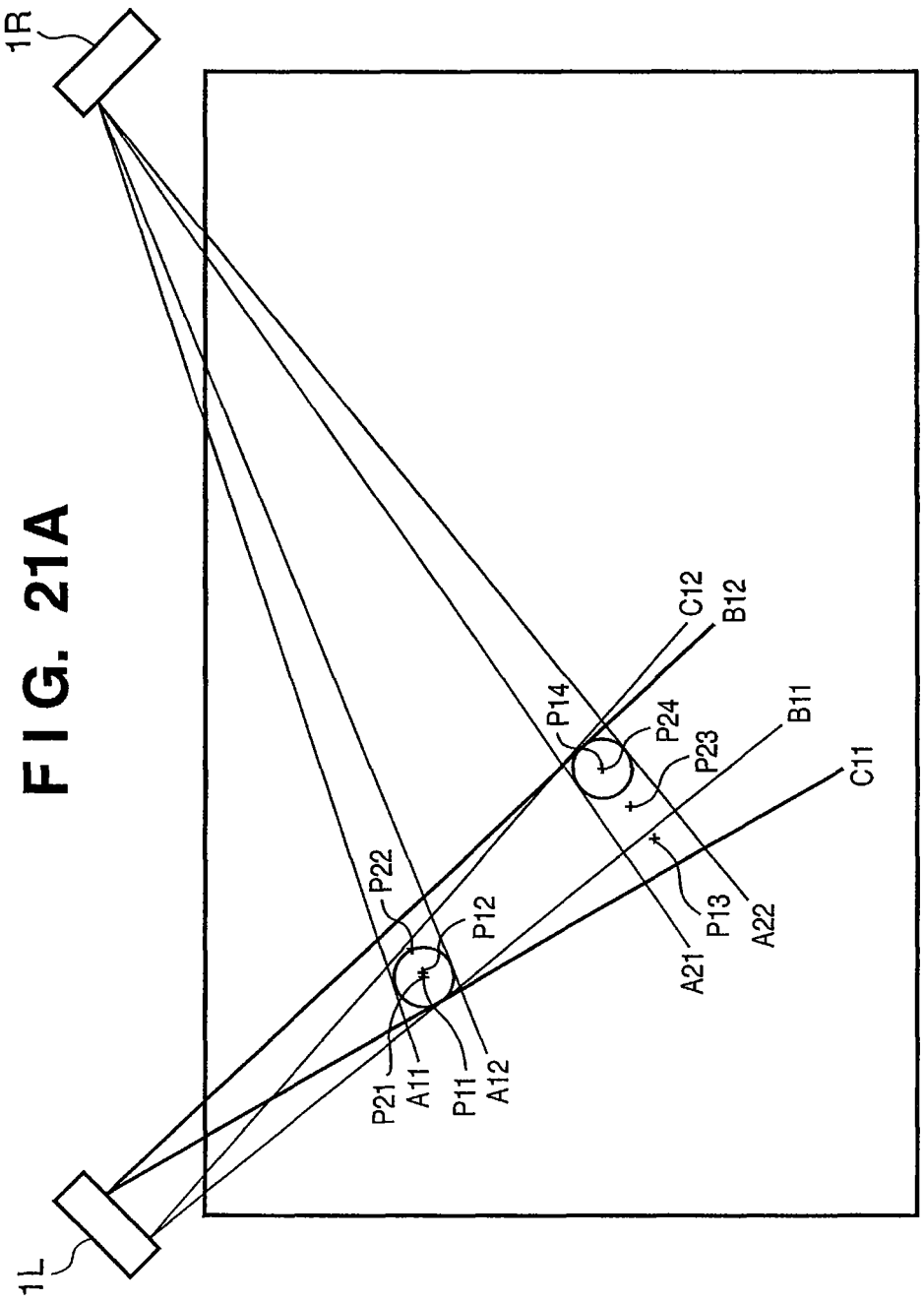

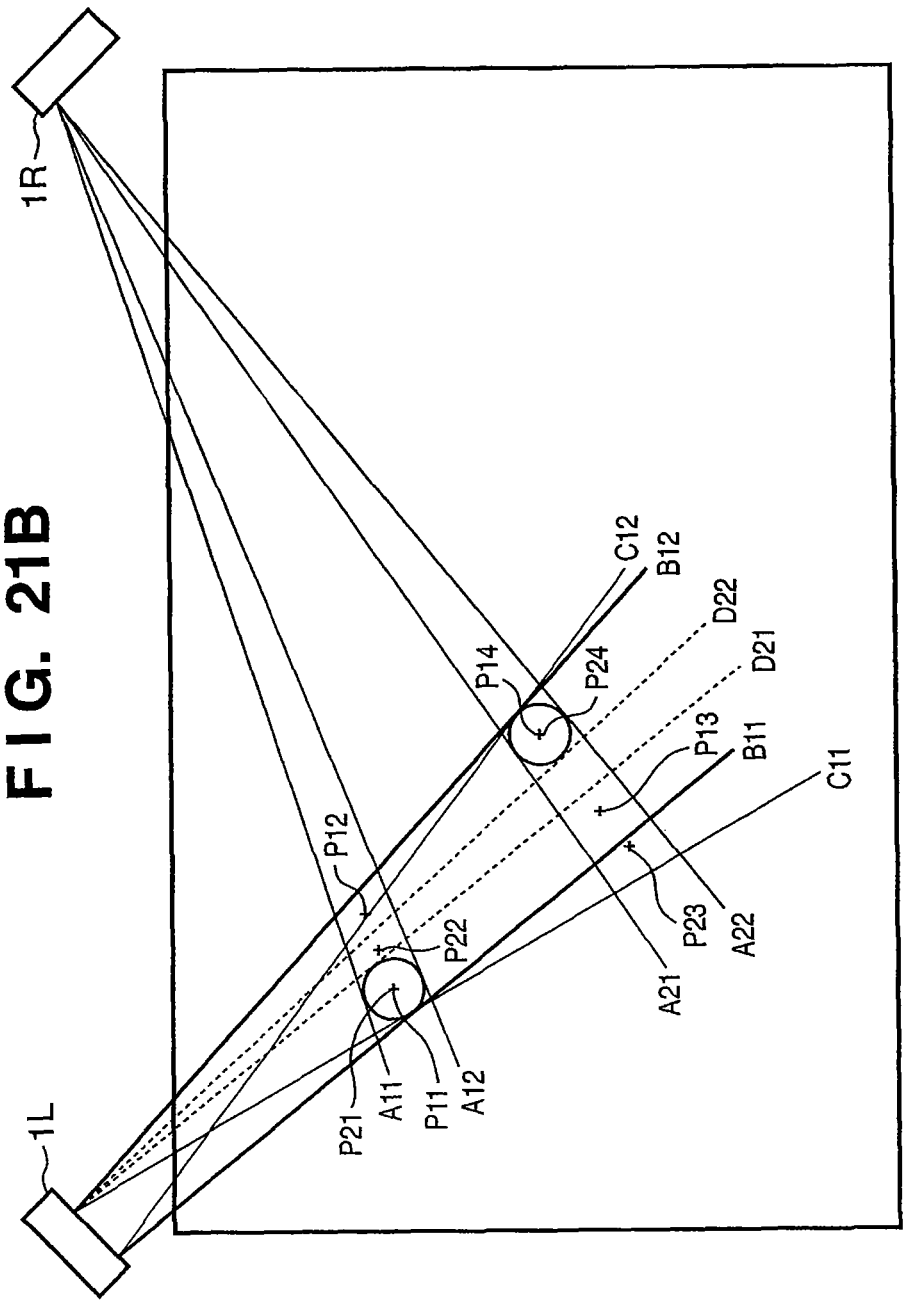

F I G. 23

| byte0 | 1 | S1 | S0 | ID4 | ID3 | ID2 | ID1 | ID0 |
|---|---|---|---|---|---|---|---|---|
| byte1 | 0 | X13 | X12 | X11 | X10 | X09 | X08 | X07 |
| byte2 | 0 | X06 | X05 | X04 | X03 | X02 | X01 | X00 |
| byte3 | 0 | Y13 | Y12 | Y11 | Y10 | Y09 | Y08 | Y07 |
| byte4 | 0 | Y06 | Y05 | Y04 | Y03 | Y02 | Y01 | Y00 |

F I G. 25
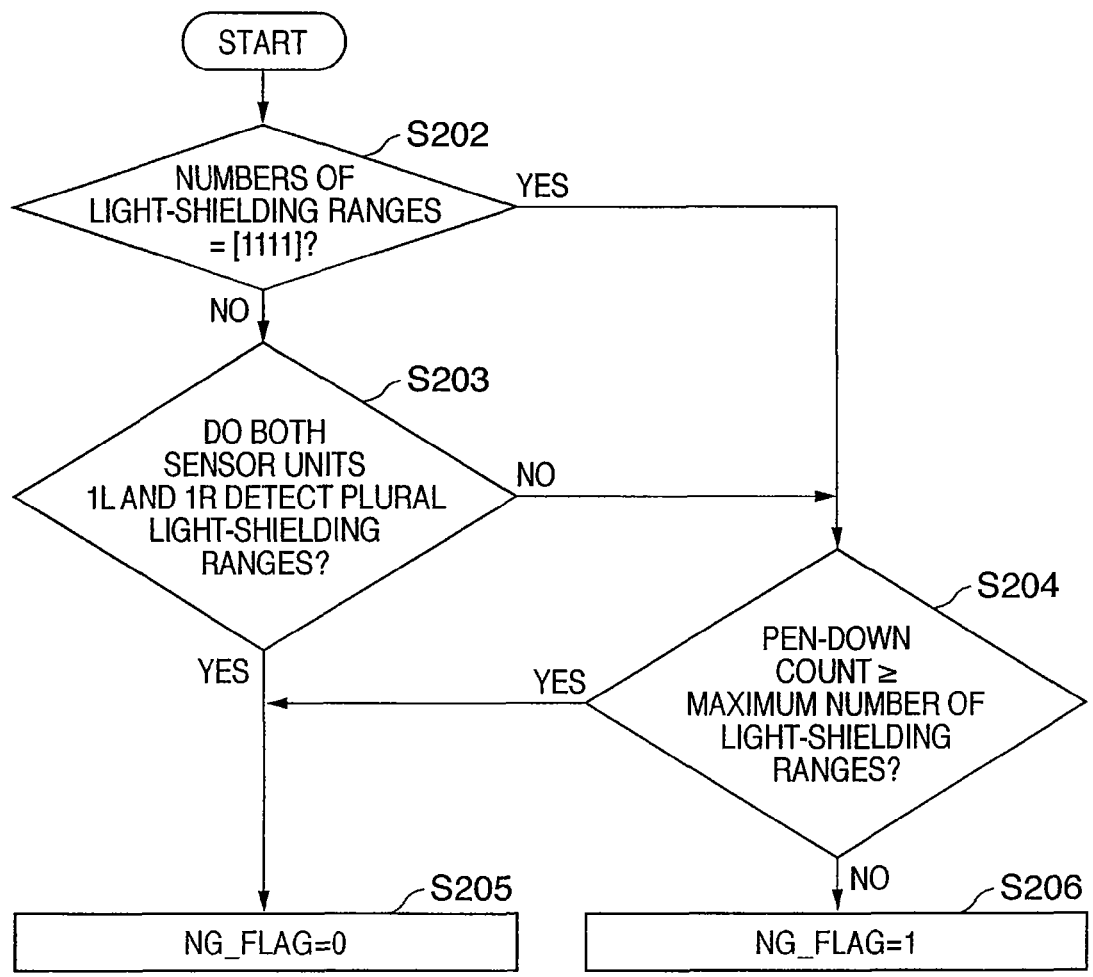

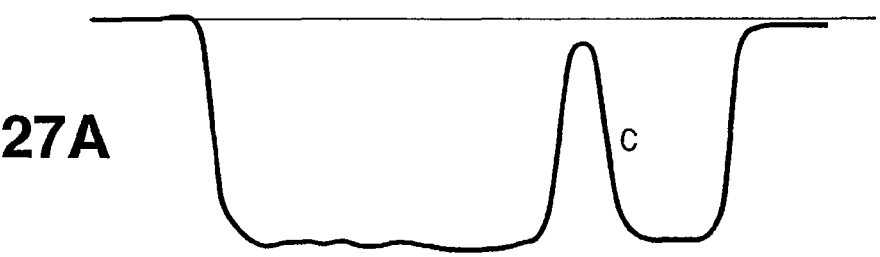
F I G. 27A
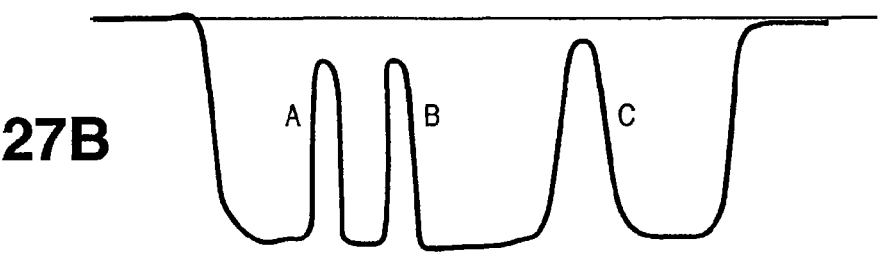
F I G. 27B
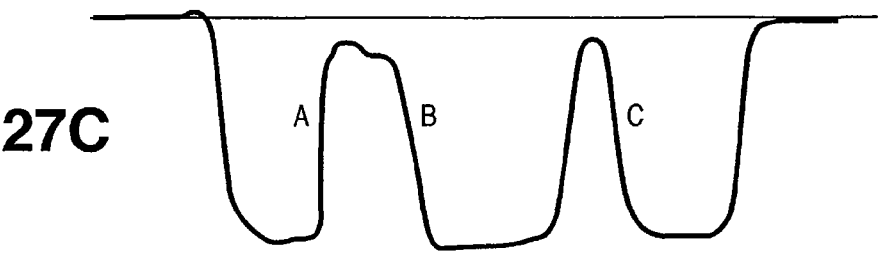
F I G. 27C

COORDINATE INPUT APPARATUS, CONTROL METHOD THEREOF, AND PROGRAM

BACKGROUND OF THE INVENTION

1. Field of the Invention

The present invention relates to a coordinate input apparatus for detecting a point position on a coordinate input region, a control method thereof, and a program.

2. Description of the Related Art

There exist coordinate input apparatuses which are used to input coordinates to a coordinate input surface by using a pointer (e.g., a dedicated input pen or finger) to control a connected computer or write characters and graphics.

Conventionally, as coordinate input apparatuses of this type, touch panels of various schemes have been proposed or become commercially available. These apparatuses are widely used because a terminal such as a personal computer can easily be operated on the screen without using any special tool.

There are various coordinate input schemes using, e.g., a resist film or an ultrasonic wave. A scheme using light is disclosed in, e.g., U.S. Pat. No. 4,507,557. In U.S. Pat. No. 4,507,557, a retroreflecting sheet is provided outside the coordinate input region. By illumination units which are arranged at the corners of the coordinate input region to emit light and light receiving units which receive light, the angles between the light receiving units and a shielding object such as a finger that shields light in the coordinate input region are detected. On the basis of the detection result, the point position of the shielding object is determined.

Japanese Patent Laid-Open No. 2000-105671 or 2001-142642 discloses a coordinate input apparatus that includes a retroreflecting member arranged on the periphery of the coordinate input region and detects the coordinates of a point (light-shielding portion) where retroreflected light is shielded.

In the apparatus of, e.g., Japanese Patent Laid-Open No. 2000-105671, the peak of the light-shielding portion by the shielding object, which is received by the light receiving unit, is detected by waveform processing, such as differentiation. The angle of the light-shielding portion with respect to the light receiving unit is detected, and the coordinates of the shielding object are calculated from the detection result. In Japanese Patent Laid-Open No. 2001-142642, comparison with a specific level pattern is done to detect one end and the other end of a light-shielding portion, and the center of the coordinates is detected.

The scheme of calculating coordinates by detecting a light-shielding position as in U.S. Pat. No. 4,507,557, Japanese Patent Laid-Open No. 2000-105671, and Japanese Patent Laid-Open No. 2001-142642 will be referred to as a light-shielding scheme hereinafter.

Such a coordinate input apparatus of light-shielding scheme is required to allow simultaneous operations of a plurality of operators to increase the convenience for efficient use in, e.g., a conference especially when the size of the coordinate input region is large. Hence, coordinate input apparatuses capable of coping with a plurality of simultaneous inputs have been devised.

To simultaneously input a plurality of coordinate points, in Japanese Patent Laid-Open Nos. 2002-055770 and 2003-303046 and Japanese Patent Registration No. 2896183, one light receiving sensor detects the angles of a plurality of light-shielding portions. Several input coordinate candidates are calculated on the basis of the combinations of the sensor angles. An actually input coordinate point is determined from the input coordinate candidates.

In, e.g., two-point input, a maximum of four coordinate points are calculated as input coordinate candidates. Of the four points, two actually input coordinate points are determined and output. That is, actual input coordinate points and false input coordinate points are discriminated from the plurality of input coordinate candidates, and final input coordinate points are determined. This determination will be referred to as "truth determination" hereinafter.

Japanese Patent Laid-Open No. 2003-303046 and Japanese Patent Registration No. 2896183 disclose detailed methods of truth determination. In these references, first and second sensors are provided at the two ends of one side of a conventional coordinate input region while being spaced apart by a sufficient distance to accurately calculate coordinates pointed in the coordinate input region. In addition, a third sensor is provided between the first and second sensors, while being spaced apart from them by a sufficient distance to accurately calculate coordinates pointed in the input region. On the basis of angle information in the third sensor which is different from those of the first and second sensors, truth is determined for a plurality of pieces of angle information detected by the first and second sensors.

Japanese Patent Laid-Open No. 2004-69483 discloses a method capable of detecting a plurality of point inputs and accurately calculating position coordinates corresponding to each point input. In Japanese Patent Laid-Open No. 2004-69483, a coordinate input apparatus has been devised which calculates, for one point target, coordinates as the intersection of bisectors of tangents on the basis of the angle information of at least three light-shielding ends of pieces of angle information of light-shielding ends serving as a plurality of tangents generated from the light-shielding shadows of sensors. This apparatus can calculate coordinates on the basis of information of one end of a light-shielding shadow of the point target, rather than information of two ends thereof. Hence, the coordinates can be calculated even when a light shield overlap occurs.

The conventional light-shielding scheme is a technique of detecting angles from the peak of light amount distribution of a light-shielding portion or the center of light amount distribution, which is defined by the two ends of light amount distribution related to a light-shielding shadow, and calculating point coordinates from combinations of angles detected by light receiving units. According to this technique, when coordinates are simultaneously input to a plurality of portions, e.g., at least two portions, the two input points may overlap almost linearly from a light receiving unit.

If light-shielding shadows corresponding to the two input points overlap in the light receiving unit, it is impossible to separate the light-shielding shadows and detect the angle of each input point. Hence, input is disabled.

A detailed example of this will be described with reference to FIG. 26.

For example, it is presumed that coordinates are input by pointers A and B to the positions in the coordinate input region as shown in FIG. 26. Light amount distributions corresponding to the pointers A and B in a light receiving unit S2 are indicated by A and B in FIG. 27B. In this case, light-shielding shadows corresponding to the two light-shielding positions of the pointers A and B are separated and detected.

FIG. 27A shows a light amount distribution as reference data without point input. Referring to FIG. 27A, the valley of the light amount distribution at a position C is generated due to, e.g., attenuation by the angular characteristic and distance of the retroreflecting member provided around the coordinate input region.

FIG. 27C shows light amount distributions corresponding to the pointers A and B in a light receiving unit S1 shown in FIG. 26. Light-shielding shadows corresponding to the two positions of the pointers A and B are detected in an overlapping state. In the information of the light amount distribution (shielded light amount distribution) with overlapping light-shielding shadows (light shield overlap), when A and B in FIG. 27B partially overlap (partial eclipse occurs), as shown in FIG. 27C, the end information in the light-shielding range of only one pointer is obtained. For this reason, the coordinates of the pointers A and B cannot be calculated by the conventional method of calculating a position (angle) on the basis of the center or central pixel number of information of two ends of the light-shielding range.

In addition, when the shadow of the first pointer on the near side completely includes the shadow of the second pointer on the far side (total eclipse occurs), the central position (angle) of the first pointer on the near side can be calculated from the two ends of the light-shielding shadow. However, no information about the second pointer on the far side can be obtained.

In the prior art, the number of light-shielding shadows generated by simultaneous input of a plurality of pointers is detected in advance. For example, if the number of light-shielding shadows detected by the second light receiving unit is "2", and the number of light-shielding shadows detected by the first light receiving unit is "1", it is determined that the light-shielding shadows corresponding to the pointers overlap in the light amount distribution detected by the first light receiving unit.

In this case, the arrangement disclosed in Japanese Patent Registration No. 2896183 issues a warning indicating that the situation has arisen, in order to call the matter to the user's attention and avoid the situation. In Japanese Patent Laid-Open No. 2002-055770 or 2003-303046, the first light receiving unit is switched to the third light receiving unit capable of detecting two separated light-shielding shadows without overlap. The angle is detected by the light receiving units (in this case, the first and third light receiving units) capable of detecting the two light-shielding shadows. The above-described truth determination is executed for input coordinate candidates obtained from the light receiving units, thereby determining the final actual input coordinates of two points.

In this case, truth determination can be executed sufficiently by using the angle information of the light receiving unit that detects light shield overlap. In Japanese Patent Laid-Open No. 2003-303046 or Japanese Patent Registration No. 2896183, truth determination is executed on the basis of the angle information of the light receiving unit that detects the light shield overlap.

As described above, in the coordinate input apparatus of light-shielding scheme, when, e.g., two pointers input positions simultaneously, and light shield overlap occurs even partially with respect to a light receiving unit, the light-shielding shadows corresponding to the two pointers may be connected inseparably. If calculation is done regarding the connected light-shielding shadows as, e.g., the shadow of one pointer, the coordinate detection accuracy degrades because of the shift from the actual position.

In Japanese Patent Laid-Open No. 2004-69483, in both the complete eclipse and the partial eclipse, coordinates can be calculated as the intersection of bisectors of tangents on the basis of the angle information of at least three light-shielding ends of pieces of angle information of light-shielding ends serving as a plurality of tangents generated from the light-shielding shadows of sensors in correspondence with one point target. However, the following problem remains unsolved.

In the coordinate input apparatus of this type, a plurality of sensor units are provided around the input region. In addition, a retroreflecting member is arranged on the left, right, upper, or lower side of the input region. Each sensor unit projects light to the retroreflecting member and receives light reflected by the retroreflecting member. Each sensor unit detects a shadow formed when a pointer shields projected or reflected light, thereby detecting the direction of the input position of the pointer viewed from the sensor unit and detecting the coordinate position indicated by the pointer. For this purpose, all sensor units must accurately detect the number and positions (angles) of shadows formed by shielding light.

However, if an individual characteristic varies, such as the sensitivity of each sensor unit, or the light projecting path and light receiving path of each sensor unit change depending on the input region, the following problem may arise. A shadow which is formed by light shielding by the pointer and should be detected simultaneously by a plurality of predetermined sensor units is detected at a predetermined position by a specific sensor unit but not detected at the predetermined position by another specific sensor unit. That is, the timing until the pointer reaches the input surface and completely forms a shadow (this state will be referred to as an "input transient state" hereinafter) may change between the sensor units.

If the shadow that should be detected cannot be detected, as described above, it is impossible to reliably detect the coordinates. The influence of this problem is especially serious when a plurality of inputs are done simultaneously by a plurality of pointers. The numbers of light-shielding ranges detected by the respective sensor units may become equal as if partial overlap of the pointers occurred. In some cases, wrong coordinates may be detected as if a pointer inputted at an impossible position.

For example, assume that pointer inputs are done at positions A and B, as shown in FIG. 28. A sensor S2 detects pieces of light-shielding end information A11, A12, A13, and A14. Similarly, a sensor S1 should detect pieces of light-shielding end information B11, B12, B13, and B14. In the input transient state, however, the sensor S1 may detect only the pieces of light-shielding end information B11 and B12. When calculation is executed by using the center of each light-shielding range, the coordinates of points A and P11 are detected. Even when coordinates are calculated by calculating the intersection of bisectors on the basis of three pieces of light-shielding end information, the coordinates of the points A and P21 or P22 are calculated. Hence, the points P11, P21, and P22 are calculated to be different from the point B.

U.S. Pat. No. 4,507,557, Japanese Patent Laid-Open Nos. 2000-105671, 2001-142642, 2002-055770, and 2003-303046, Japanese Patent Registration No. 2896183, and Japanese Patent Laid-Open No. 2004-69483 described above have no description of a means for solving this problem.

SUMMARY OF THE INVENTION

The present invention has been made to solve the above-described problems, and has as its object to provide a coordinate input apparatus capable of accurately calculating position coordinates, a control method thereof, and a program.

According the first aspect of the present invention, a coordinate input apparatus for detecting a point position of a pointer on a coordinate input region, comprising:

a plurality of sensor units which receive arrival light;

a detection unit which detects change ranges of light amount distributions obtained from the plurality of sensor units upon a pointing operation of the pointer on the coordinate input region; and an execution unit which executes calculation of coordinate values corresponding to the change ranges on the basis of the number of change ranges in the plurality of sensor units detected by the detection unit and the number of pen-down signals obtained from the pointer.

In a preferred embodiment, the apparatus further comprises a reflection unit which is provided at a periphery of the coordinate input region and retroreflects incident light, wherein each of the plurality of sensor units comprises two, first and second light receiving units.

In a preferred embodiment, the pointer comprises a signal generation unit which generates the pen-down signal.

In a preferred embodiment, the execution unit comprises a determination unit which determines whether a point state of the pointer is an input transient state, on the basis of the number of change ranges in the plurality of sensor units detected by the detection unit and the number of pen-down signals obtained from the pointer, and the execution unit executes calculation of coordinate values corresponding to the change ranges when the determination unit determines that the point state is not the input transient state.

In a preferred embodiment, when a plurality of change ranges are obtained from the plurality of sensor units, or when the number of pen-down signals is not smaller than the maximum number of change ranges in the plurality of sensor units, the determination unit determines that the point state is not the input transient state.

In a preferred embodiment, the execution unit controls whether to execute calculation of coordinate values corresponding to the change ranges, by executing detection a plurality of number of times on the basis of a detection period of the detection unit and a detection period of the pen-down signal, and comparing detection results.

In a preferred embodiment, the apparatus further comprises a synchronization unit which synchronizes a detection timing of the detection unit and a detection timing of the pen-down signal.

According to the second aspect of the present invention, a control method of a coordinate input apparatus which includes a plurality of sensor units for receiving arrival light and detects a point position of a pointer on a coordinate input region, the method comprising:

a detection step of detecting change ranges of light amount distributions obtained from the plurality of sensor units upon a pointing operation of the pointer on the coordinate input region; and an execution step of executing calculation of coordinate values corresponding to the change ranges on the basis of the number of change ranges in the plurality of sensor units detected in the detection step and the number of pen-down signals obtained from the pointer.

According to the third aspect of the present invention, the computer program which is stored in a computer-readable medium and causes a computer to control a coordinate input apparatus that includes a plurality of sensor units for receiving arrival light and detects a point position of a pointer on a coordinate input region, the program causing the computer to execute a detection step of detecting change ranges of light amount distributions obtained from the plurality of sensor units upon a pointing operation of the pointer on the coordinate input region, and an execution step of executing calculation of coordinate values corresponding to the change ranges on the basis of the number of change ranges in the plurality of sensor units detected in the detection step and the number of pen-down signals obtained from the pointer.

Further features of the present invention will be apparent from the following description of exemplary embodiments with reference to the attached drawings.

BRIEF DESCRIPTION OF THE DRAWINGS

FIG. 3A is a view showing the optical arrangement of the sensor unit according to the embodiment of the present invention;

FIGS. 10A to 10D are graphs for explaining light-shielding range detection according to the embodiment of the present invention;

FIG. 11 is a view for explaining light-shielding range detection according to the embodiment of the present invention;

FIG. 20 is a table showing combinations of the numbers of light-shielding ranges according to the embodiment of the present invention;

FIG. 21A is a view for explaining an example of coordinate calculation based on light-shielding range end information according to the embodiment of the present invention;

FIG. 21B is a view for explaining an example of coordinate calculation based on light-shielding range end information according to the embodiment of the present invention;

FIG. 23 is a view showing data format examples in coordinate output according to the embodiment of the present invention;

FIG. 25 is a flowchart showing input transient state determination executed by the coordinate input apparatus according to the embodiment of the present invention;

FIGS. 27A to 27C are views for explaining the distributions of light received by the sensor units according to a prior art.

DESCRIPTION OF THE EMBODIMENTS

A preferred embodiment of the present invention will now be described in detail with reference to the drawings. It should be noted that the relative arrangement of the components, the numerical expressions and numerical values set forth in the embodiment do not limit the scope of the present invention unless it is specifically stated otherwise.

<Description of Schematic Arrangement of Apparatus>

The schematic arrangement of an overall coordinate input apparatus will be described first with reference to FIG. 1.

Figure 1:
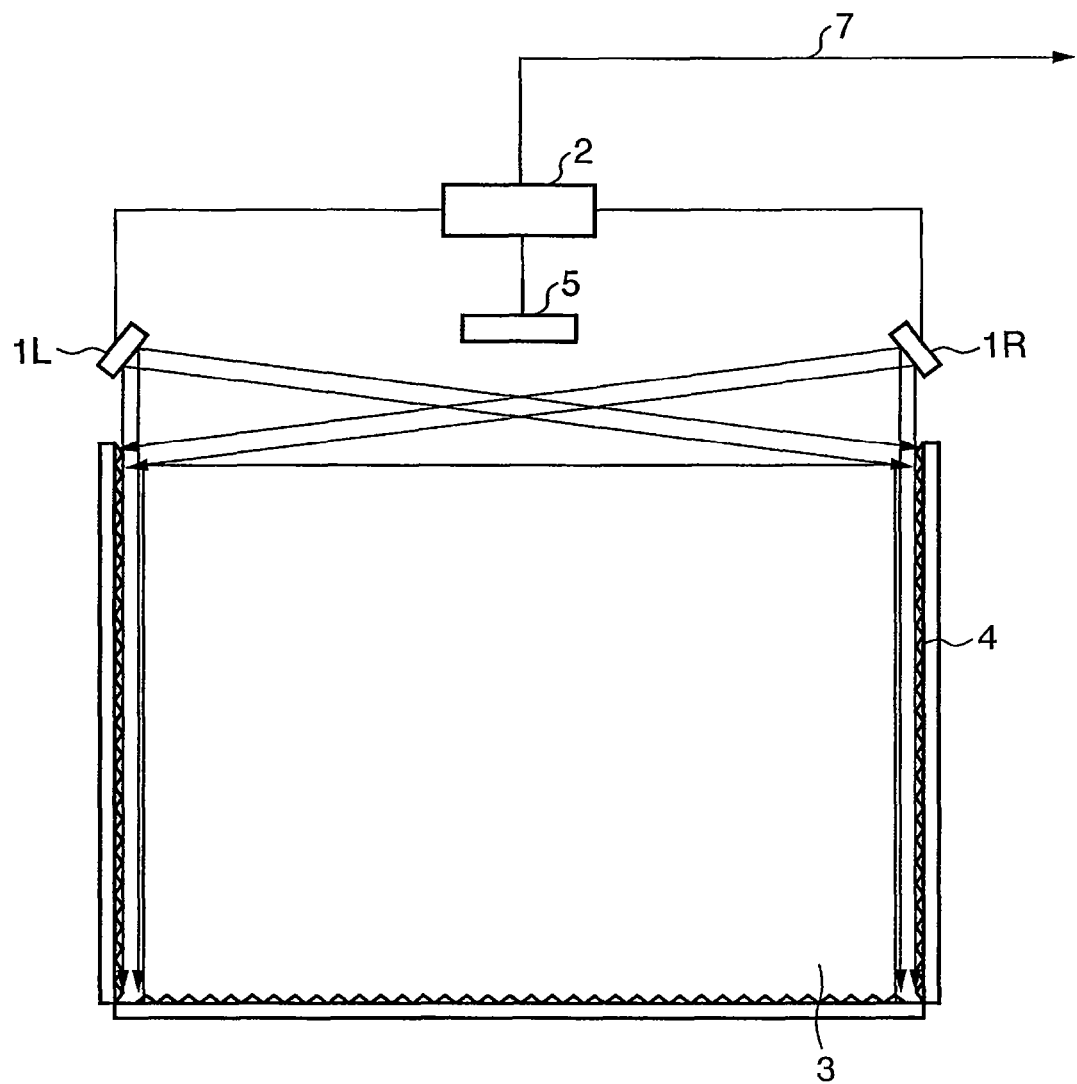
FIG. 1 is a view showing the schematic arrangement of a coordinate input apparatus of light-shielding scheme according to an embodiment of the present invention.

FIG. 1 is a view showing the schematic arrangement of a coordinate input apparatus of light-shielding scheme according to the embodiment of the present invention.

Referring to FIG. 1, sensor units 1L and 1R have light projecting units and light receiving units. In the embodiment, the sensor units 1L and 1R are arranged parallel to the X-axis of a coordinate input effective region 3 serving as a coordinate input surface and symmetrically about the Y-axis while being spaced apart by a predetermined distance, as shown in FIG. 1. The sensor units 1L and 1R are connected to a control/arithmetic unit 2. Each of the sensor units 1L and 1R receives a control signal from the control/arithmetic unit 2 and transmits a detected signal to the control/arithmetic unit 2.

A retroreflecting member 4 has a retroreflecting surface to reflect incident light in the direction of arrival. The retroreflecting member 4 is arranged on three outer sides of the coordinate input effective region 3, as shown in FIG. 1, to retroreflect, toward the left and right sensor units 1L and 1R, light projected within a range of almost 90° from the sensor units 1L and 1R.

The retroreflecting member 4 has a three-dimensional structure microscopically. A bead-type retroreflecting tape or a retroreflecting tape which causes retroreflection by periodically arraying corner cubes by, e.g., machining is currently known.

The sensor units 1L and 1R one-dimensionally detect the light retroreflected by the retroreflecting member 4, and transmit the light amount distribution to the control/arithmetic unit 2.

The coordinate input effective region 3 formed from the display screen of a display apparatus such as a PDP, rear projector, or LCD panel can be used as an interactive input device.

In this arrangement, when input by a pointing unit, such as a finger or a pointer, is done in the coordinate input effective region 3, light projected from the light projecting units of the sensor units 1L and 1R is shielded (light-shielding portion). The light receiving units of the sensor units 1L and 1R cannot detect the light of the light-shielding portion (reflected light by retroreflection). It is consequently possible to determine the direction of light that cannot be detected.

The control/arithmetic unit 2 detects a plurality of light-shielding ranges of the input portion by the pointer on the basis of a change in light amount detected by the left and right sensor units 1L and 1R. On the basis of the end information of the light-shielding ranges, the control/arithmetic unit 2 calculates the direction (angle) of each end of the light-shielding ranges with respect to the sensor units 1L and 1R. If the pointer has a signal generation unit, a pen signal receiving unit 5 receives a pen signal from the pointer.

On the basis of the number of detected light-shielding ranges, the control/arithmetic unit 2 determines data obtained from the light-shielding ranges and to be used for coordinate calculation. The control/arithmetic unit 2 geometrically calculates the light-shielding position of the pointer on the coordinate input effective region 3 on the basis of, e.g., the calculated direction (angle) and the distance information between the sensor units 1L and 1R. The control/arithmetic unit 2 outputs the coordinate value through an interface 7 (e.g., USB or IEEE 1394) to an external terminal, such as a host computer connected to the display apparatus.

In this way, the pointer can operate the external terminal can be operated by, e.g., drawing a line on the screen or manipulating an icon displayed on the display apparatus.

<Detailed Description of Sensor Unit 1>

The arrangement of the sensor units 1L and 1R will be described next with reference to FIG. 2. Each of the sensor units 1L and 1R is roughly divided into a light projecting unit and a light receiving unit.

Figure 2:
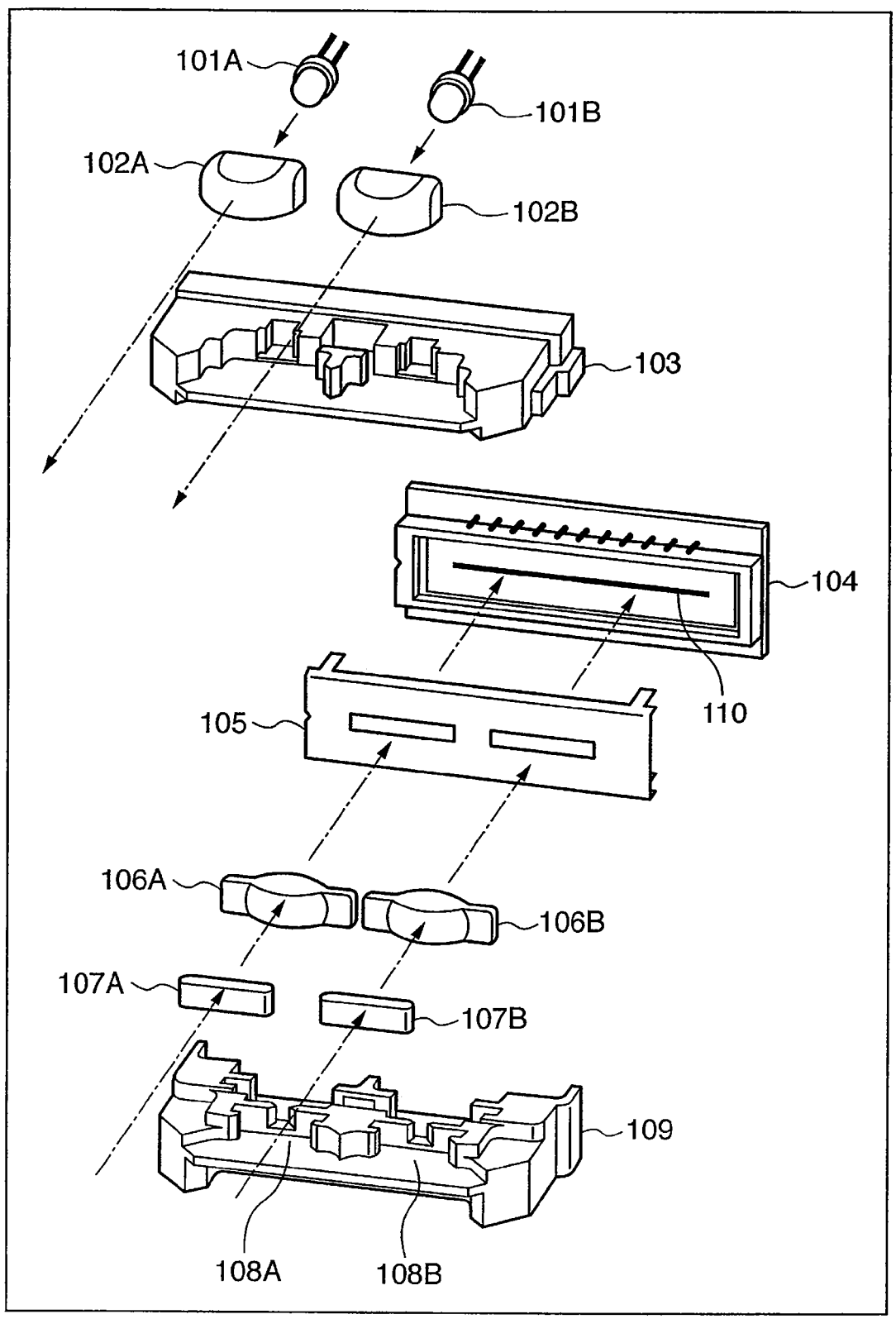
FIG. 2 is an exploded view showing the detailed arrangement of a sensor unit according to the embodiment of the present invention.

FIG. 2 is an exploded view showing the detailed arrangement of the sensor unit according to the embodiment of the present invention.

Referring to FIG. 2, infrared LEDs 101A and 101B to emit infrared light project light within a range of almost 90° toward the retroreflecting member 4 through projecting lenses 102A and 102B, respectively. The light projecting units in the sensor units 1L and 1R are implemented by the infrared LEDs 101A and 101B and the projecting lenses 102A and 102B. Hence, each of the sensor units 1L and 1R includes two light projecting units.

Infrared light projected from the light projecting units is retroreflected by the retroreflecting member 4 in the direction of arrival and detected by the light receiving units in the sensor units 1L and 1R.

The light receiving unit comprises a 1D line CCD 104 with a shield member 105 which limits the visual field of a light beam and electrically shields the light, and light receiving lenses 106A and 106B serving as a condenser optical system. The light receiving unit also comprises irises 108A and 108B to roughly restrict the incident direction of incident light, and infrared filters 107A and 107B to prevent incidence of excess light (disturbance light) such as visible light.

The light receiving lenses 106A and 106B focus the light reflected by the retroreflecting member 4 on the surface of a detection element 110 of the line CCD 104 through the infrared filters 107A and 107B and the irises 108A and 108B. Hence, each of the sensor units 1L and 1R includes two light receiving units.

Members 103 and 109 function as upper and lower hoods 103 and 109 which arrange the optical components included in the light projecting units and light receiving units and prevent the light projected by the light projecting units from directly entering the light receiving units or cut extraneous light.

In the embodiment, the irises 108A and 108B are integrated with the lower hood 109. However, the irises 108A and 108B may be separate components. In addition, the upper hood 103 may provide a positioning unit of the irises 108A and 108B and the light receiving lenses 106A and 106B. In this case, an arrangement to facilitate positioning of each light receiving unit with respect to the light emission center of a corresponding light projecting unit (i.e., an arrangement which allows only the upper hood 103 to arrange all the main optical components) can be implemented.

FIG. 3A is a view showing the assembled state of the sensor unit 1L (1R) in FIG. 2, which is viewed from the front direction (a direction perpendicular to the coordinate input surface). As shown in FIG. 3A, the two light projecting units in the sensor unit 1L (1R) are spaced apart by a predetermined distance d, and are arranged such that the directions of principal rays are almost parallel. The sensor unit 1L (1R) is configured to project light within a range of almost 90° through the projecting lenses 102A and 102B.

Figure 3B:
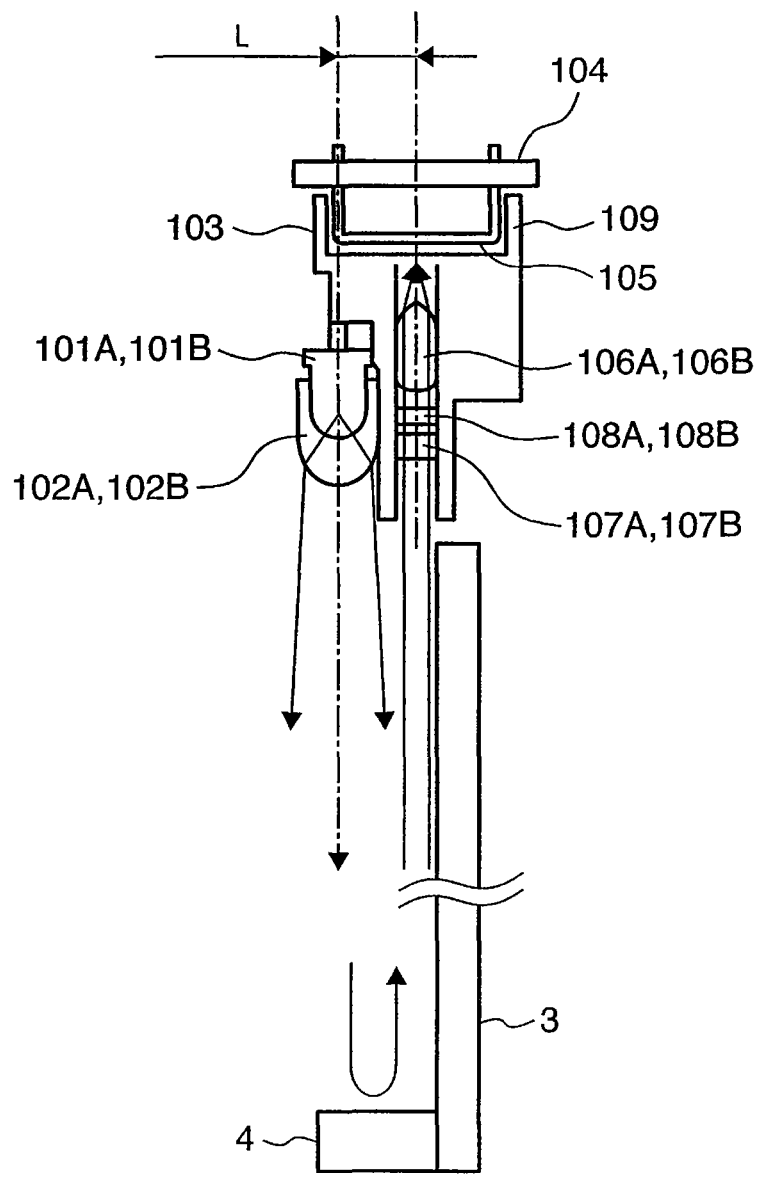
FIG. 3B is a sectional view showing the optical arrangement of the sensor unit according to the embodiment of the present invention.

FIG. 3B is a sectional view of a portion indicated by open arrows in FIG. 3A. Light from the infrared LED 101A (101B) is projected mainly toward the retroreflecting member 4 as a light beam restricted by the projecting lens 102A (102B) to be almost parallel to the coordinate input surface.

Figure 3C:
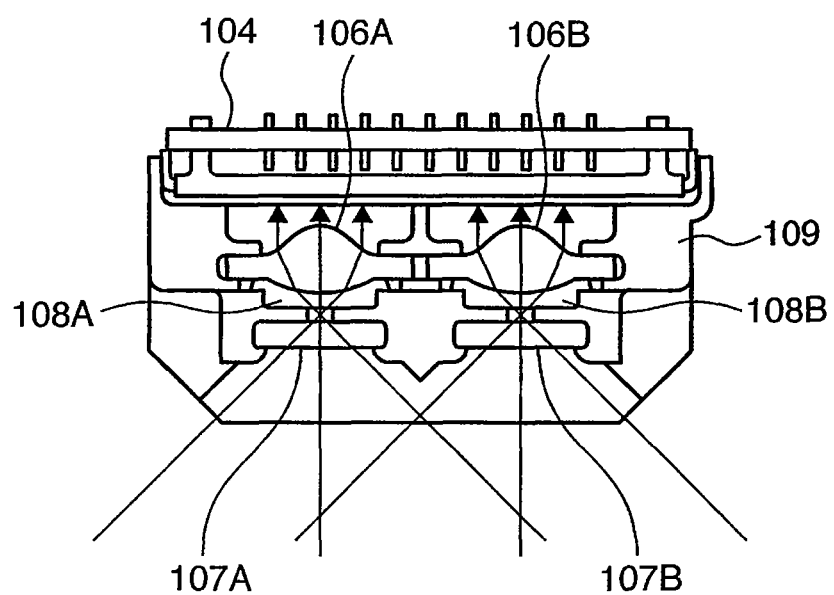
FIG. 3C is a view showing the optical arrangement of the sensor unit according to the embodiment of the present invention.

FIG. 3C is a view showing the sensor unit without the infrared LEDs 101A and 101B, the projecting lenses 102A and 102B, and the upper hood 103 in FIG. 3A, which is viewed from the front direction (a direction perpendicular to the coordinate input surface).

In the embodiment, the light projecting units and the light receiving units are stacked in the direction perpendicular to the coordinate input effective region 3 serving as the coordinate input surface (FIG. 3B). That is, when viewed from the front direction (the direction perpendicular to the coordinate input surface), the light emission center of each light projecting unit matches the reference position of a corresponding light receiving unit (the reference position corresponds to a reference point position to measure an angle, i.e., the position of the iris 108A (108B) in the embodiment where light beams cross in FIG. 3C).

As described above, the two light projecting units are spaced apart by the predetermined distance d, and arranged such that the directions of principal rays are almost parallel. Hence, the two light receiving units are also spaced apart by the predetermined distance d, and arranged such that the optical axes (optical symmetry axes) are almost parallel.

The light beam that is almost parallel to the coordinate input surface, and which is projected from a light projecting unit within a range of almost 90° in the in-plane direction, is retroreflected by the retroreflecting member 4 in the direction of arrival of light. The light is focused and forms an image on the surface of the detection element 110 of the line CCD 104, through the infrared filter 107A (107B), the iris 108A (108B), and the light receiving lens 106A (106B).

The output signal from the line CCD 104 represents the light amount distribution corresponding to the incident angle of reflected light. Hence, the pixel number of each pixel included in the line CCD 104 indicates angle information.

A distance L between the light projecting unit and the light receiving unit shown in FIG. 3B is much shorter than the distance from the light projecting unit to the retroreflecting member 4. For this reason, even the light receiving unit having the distance L with respect to the light projecting unit can detect sufficient retroreflected light.

As described above, the sensor unit 1L (1R) includes at least two light projecting units and two light receiving units to detect light projected from the light projecting units (in the embodiment, two sets of light projecting units and two sets of light receiving units are present).

In the embodiment, the left portion of the detection element 110 that is linearly arranged on the line CCD 104 as part of the light receiving units is defined as the condenser region of the first light receiving unit, and the right portion is defined as the condenser region of the second light receiving unit, thereby sharing the component. However, the present invention is not limited thereto, and the line CCDs may individually be provided for the light receiving units.

<Description of Control/Arithmetic Unit>

The control/arithmetic unit 2 and the sensor units 1L and 1R mainly exchange CCD control signals for the line CCDs 104 in the light receiving units, the CCD clock signal and output signal, and the driving signals of the infrared LEDs 101A and 101B in the light projecting units.

The detailed arrangement of the control/arithmetic unit 2 will be described with reference to FIG. 4.

Figure 4:
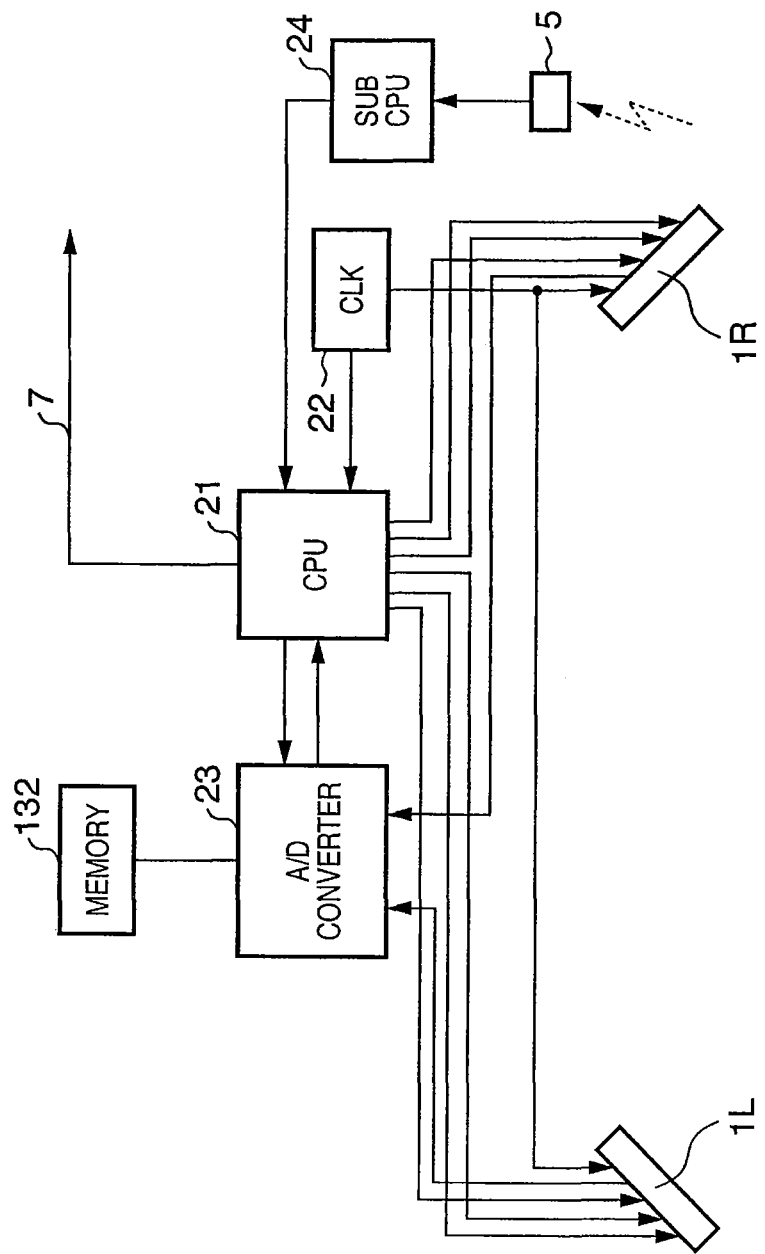
FIG. 4 is a block diagram showing the detailed arrangement of a control/arithmetic unit according to the embodiment of the present invention.

FIG. 4 is a block diagram showing the detailed arrangement of the control/arithmetic unit according to the embodiment of the present invention.

An arithmetic control circuit (CPU) 21 including, e.g., a one-chip microcomputer outputs a CCD control signal to control the shutter timing and data output of the line CCD 104.

The arithmetic control circuit 21 operates in accordance with a clock signal from a clock generation circuit (CLK) 22. Clock signals for the CCDs are transmitted from the clock generation circuit (CLK) 22 to the sensor units 1L and 1R, and are also input to the arithmetic control circuit 21 to execute various kinds of control in synchronism with the line CCD 104 in each sensor unit.

LED driving signals to drive the infrared LEDs 101A and 101B of the light projecting units are supplied from the arithmetic control circuit 21 to the infrared LEDs 101A and 101B in the light projecting units in the sensor units 1L and 1R through LED drive circuits (not shown).

An A/D converter 23 receives a detection signal from the line CCD 104 in each light receiving unit of the sensor units 1L and 1R, and converts the signal into a digital value under the control of the arithmetic control circuit 21. The converted digital value is stored in a memory 132 and is used to calculate the angle of a pointer. A coordinate value is calculated from the calculated angle and output to an external terminal via the serial interface 7 (e.g., USB, IEEE 1394, or RS-232C).

When a pen is used as a pointer, the pen signal receiving unit 5, which receives a pen signal from the pen, outputs a digital signal that is obtained by demodulating the pen signal. A sub CPU 24, serving as a pen signal detection circuit, receives and analyzes the pen signal. The sub CPU 24 outputs the analysis result to the arithmetic control circuit 21.

<Description of Light Amount Distribution Detection>

Figure 5:
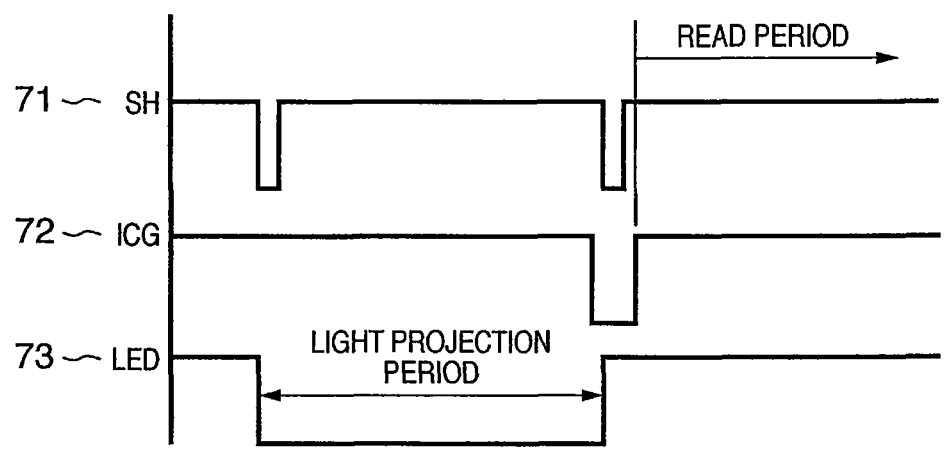
FIG. 5 is a timing chart of control signals according to the embodiment of the present invention.

FIG. 5 is a timing chart of control signals according to the embodiment of the present invention.

FIG. 5 particularly shows a timing chart of control signals to one light receiving unit in the sensor unit 1L (1R) and the infrared LED 101A (101B) serving as illumination corresponding to the light receiving unit.

Reference numerals 71 and 72 denote control signals to control the CCD. The shutter open time of the line CCD 104 is determined by the interval of SH signals 71. The ICG signal 72 is a gate signal to the sensor unit 1L (1R) to transfer charges in the photoelectric conversion unit of the internal line CCD 104 to a read unit.

Reference numeral 73 denotes a driving signal of the infrared LED 101A (101B). To turn on the infrared LED 101A (101B), the LED signal 73 is supplied to the infrared LED 101A (101B) at the period of the SH signal 71.

After driving of the light projecting units of both the sensor units 1L and 1R is ended, the detection signals from the light receiving units (line CCDs 104) of both the sensor units 1L and 1R are read out.

Figure 6:
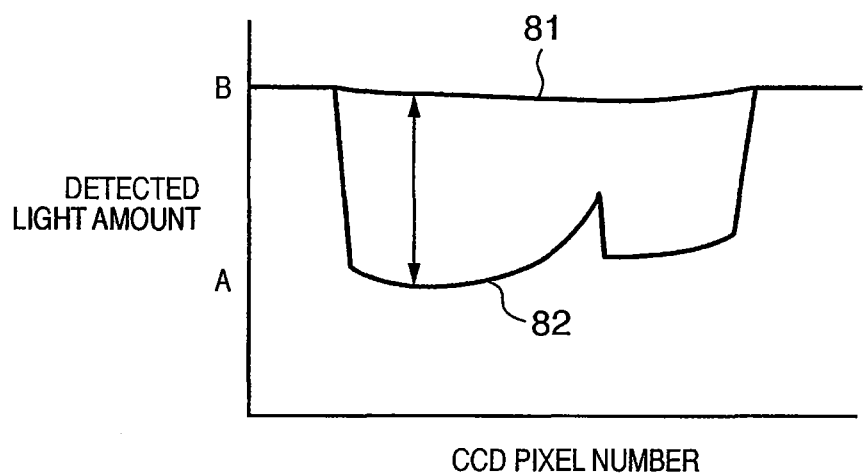
FIG. 6 is a graph for explaining a light amount distribution detected by the sensor unit according to the embodiment of the present invention.

When no input by a pointer to the coordinate input effective region 3 is present, a light amount distribution shown in FIG. 6 is obtained as the detection signal read out from each of the sensor units 1L and 1R. However, the light amount distribution is not always obtained in every system. The light amount distribution changes depending on the retroreflecting characteristic of the retroreflecting member 4, the characteristic of the light projecting unit, and changes over time (e.g., contamination of the reflecting surface).

Referring to FIG. 6, level A indicates the maximum light amount, and level B indicates the minimum light amount.

When there is no reflected light from the retroreflecting member 4, the light amount level obtained by the sensor units 1L and 1R approaches the level B. As the reflected light amount increases, the light amount level changes to the level A. In this way, the detection signals output from the sensor units 1L and 1R are sequentially A/D-converted by the A/D converter 23, and received by the arithmetic control circuit 21 as digital data.

Figure 7:
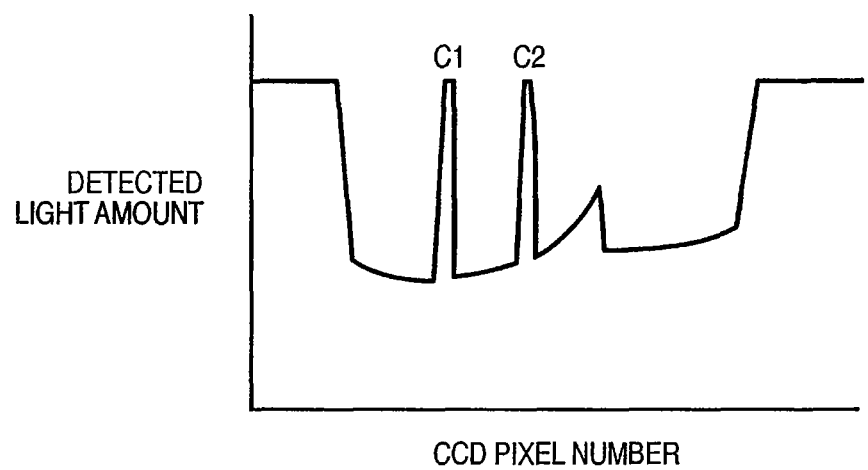
FIG. 7 is a graph for explaining a light amount distribution detected by the sensor unit according to the embodiment of the present invention.

On the other hand, if there is input to the coordinate input effective region 3 by a pointer, the light amount distribution shown in FIG. 7 is obtained as the output from each of the sensor units 1L and 1R.

At portions C1 and C2 of this light amount distribution, the reflected light from the retroreflecting member 4 is shielded by pointers, so that the reflected light amount decreases only at these portions (light-shielding ranges). Especially in FIG. 7, since the reflected light from the retroreflecting member 4 is shielded by a plurality of pointers, a plurality of light-shielding ranges are detected.

In the embodiment, the angles of each pointer, with respect to the sensor units 1L and 1R, are detected on the basis of the difference between the light amount distribution shown in FIG. 6 without input by pointers, and the light amount distribution shown in FIG. 7 with input by pointers.

More specifically, as the light amount distribution data in FIG. 6, light amount distribution data 81 without light projection (illumination) by the light projecting units, and light amount distribution data 82 without input by pointers (without shields) during light projection (illumination), are stored in the memory 132 in advance as an initial state.

Whether the light amount distribution changes, as shown in FIG. 7, during the sample period of the detection signal from each of the sensor units 1L and 1R is detected on the basis of the difference between the light amount distribution during the sample period and the light amount distribution in the initial state stored in the memory 132. When a change in the light amount distribution is detected, the change portion is defined as the input point of a pointer, and calculation of determining an input angle (determining the ends of the light-shielding range) is executed.

As described above, the present invention provides a plurality of light receiving units in correspondence with a one line CCD 104. A light projecting unit is provided in correspondence with each light receiving unit. Hence, to drive the light receiving units (or light projecting units) at different timings, each unit is driven at the above-described signal timing.

Figure 8:
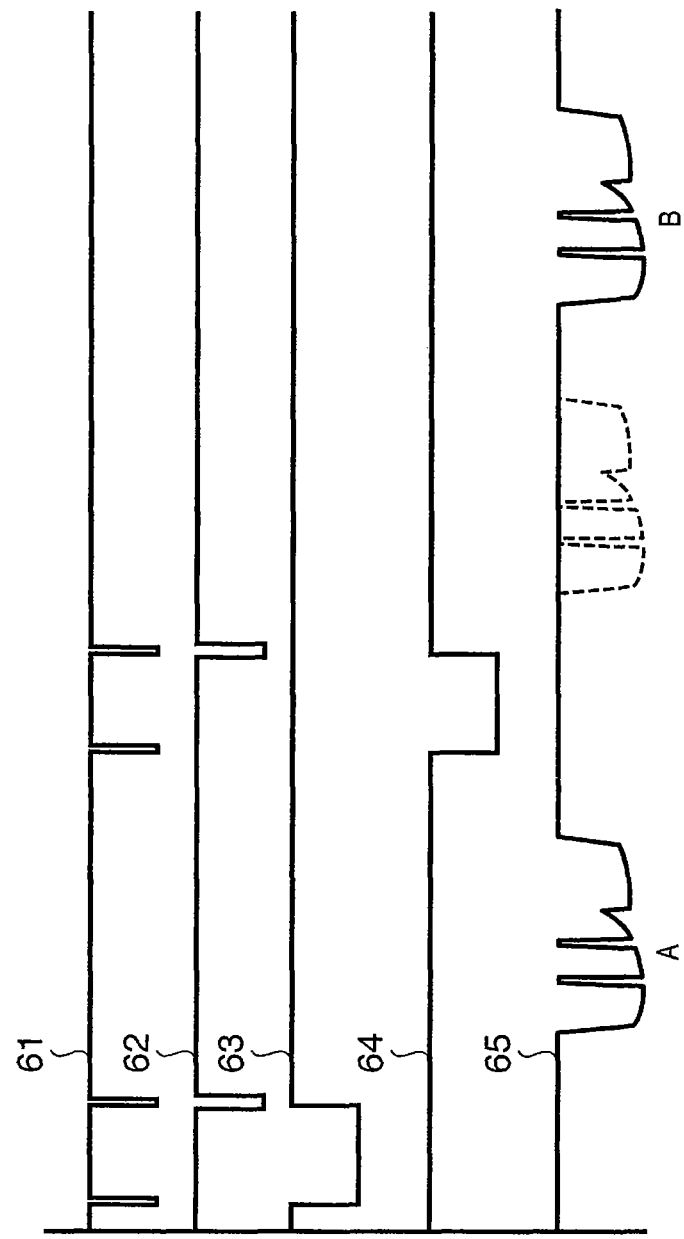
FIG. 8 is a timing chart of signal read according to the embodiment of the present invention.

FIG. 8 is a timing chart of the signals. First, to cause one light receiving unit in the sensor unit 1L to detect light on the leading edge side of the line CCD 104 in the sensor unit 1L, the infrared LED (e.g., the infrared LED 101A) is driven at the timing of a signal 63 with respect to an SH signal 61. A signal is read out from the line CCD 104 in accordance with an ICG signal 62. At the same time, pixel data in the light receiving range on the leading edge side of the line CCD 104 is read out (a portion A in a signal 65).

The SH signal 61 is supplied to the line CCD 104. To cause the other light receiving unit in the sensor unit 1L to detect light, a driving signal 64 is supplied to the infrared LED (e.g., the infrared LED 101B). The light receiving signal is output in a region (a portion B in the signal 65) that does not overlap the previously detected signal (broken line portion) of the leading edge portion.

When the other sensor unit 1R is driven at another timing, CCD signals are read out from the respective sensors. In the present invention, detection signals by a maximum of four light receiving units are acquired.

In the embodiment, a total of four light receiving units in the left and right sensor units 1L and 1R are driven at different timings. However, the present invention is not limited to this. If light emitting operations of the sensor units do not affect each other, the light receiving units may be driven simultaneously. Alternatively, the light receiving units may be driven in arbitrary combinations.

<Description of Angle Calculation>

To calculate the angles of a pointer with respect to the sensor units 1L and 1R, the light-shielding range by the pointer needs to be detected first.

Angle calculation of a pointer by one of the sensor units 1L and 1R (e.g., the sensor unit 1L) will be described hereinafter. The other sensor unit (sensor unit 1R) also executes the same angle calculation, as a matter of course.

The signal (light amount distribution data) 81 and signal (light amount distribution data) 82 shown in FIG. 6 are stored in the memory 132 in advance as light amount distribution data at the time of power-on. The input range (light-shielding range) of a pointer is detected by comparing the signals with a light amount distribution obtained by actual input using the pointer.

When a light amount distribution with the portions C1 and C2 is input, as shown in FIG. 7, the difference between the light amount distribution and the light amount distribution data 82 stored in the memory 132 is calculated. By using the calculation result and the difference between the light amount distribution data 82 and 81, the light amount change ratio from the mode without light shield (input) is calculated. When the light amount change ratio is calculated in this way, the influence of, e.g., partial nonuniformity of the light amount distribution can be removed.

A pixel number on the line CCD 104 where the light amount changes is specified by using a threshold value with respect to the calculated light amount change ratio. When information such as a detection signal level is used, finer pixel information than a pixel number can be specified. The ends of the light-shielding range can be determined from the pixel numbers. For example, the median (the pixel number of the line CCD 104) of the light-shielding range is derived as the angle information of the pointer.

To calculate an actual coordinate value from obtained pixel numbers, the pixel numbers must be converted into angle information θ. Conversion to angle information can be implemented by using, e.g., a polynomial. For example, letting e be the CCD pixel number, n be the order, and Tn be the coefficient of each order, the angle θ can be calculated by $$\theta = Tn \cdot e^n + T(n-1) \cdot e^{(n-1)} + T^{(n-2)} \cdot e^{(n-2)} + \ldots, +T0 \quad (1)$$

The coefficient of each order can be determined from the actual measurement value or design value. The order is determined in consideration of the required coordinate accuracy or the like.

As described above, the sensor unit 1L includes two light receiving units L1 and L2. The above-described processing of determining the ends of the light-shielding range is executed first for the light receiving unit L1, i.e., the light receiving unit that detects the light amount distribution of the portion A in FIG. 8. For the portion A, the processing of calculating the light amount distribution difference and the change ratio is executed for all data corresponding to the portion A stored in the memory 132.

For the light amount distribution of the portion B corresponding to the light receiving unit L2, the above-described calculation processing is not executed for all data corresponding to the portion B stored in the memory 132 to shorten the process time. In this case, a limited search range to execute light-shielding range search is determined from the light-shielding range search result of the portion A. The same calculation processing as in the light-shielding range search processing of the portion A is executed in the obtained search range, thereby determining the CCD pixel number corresponding to an end of the light-shielding range and calculating angle information.

Figure 9:
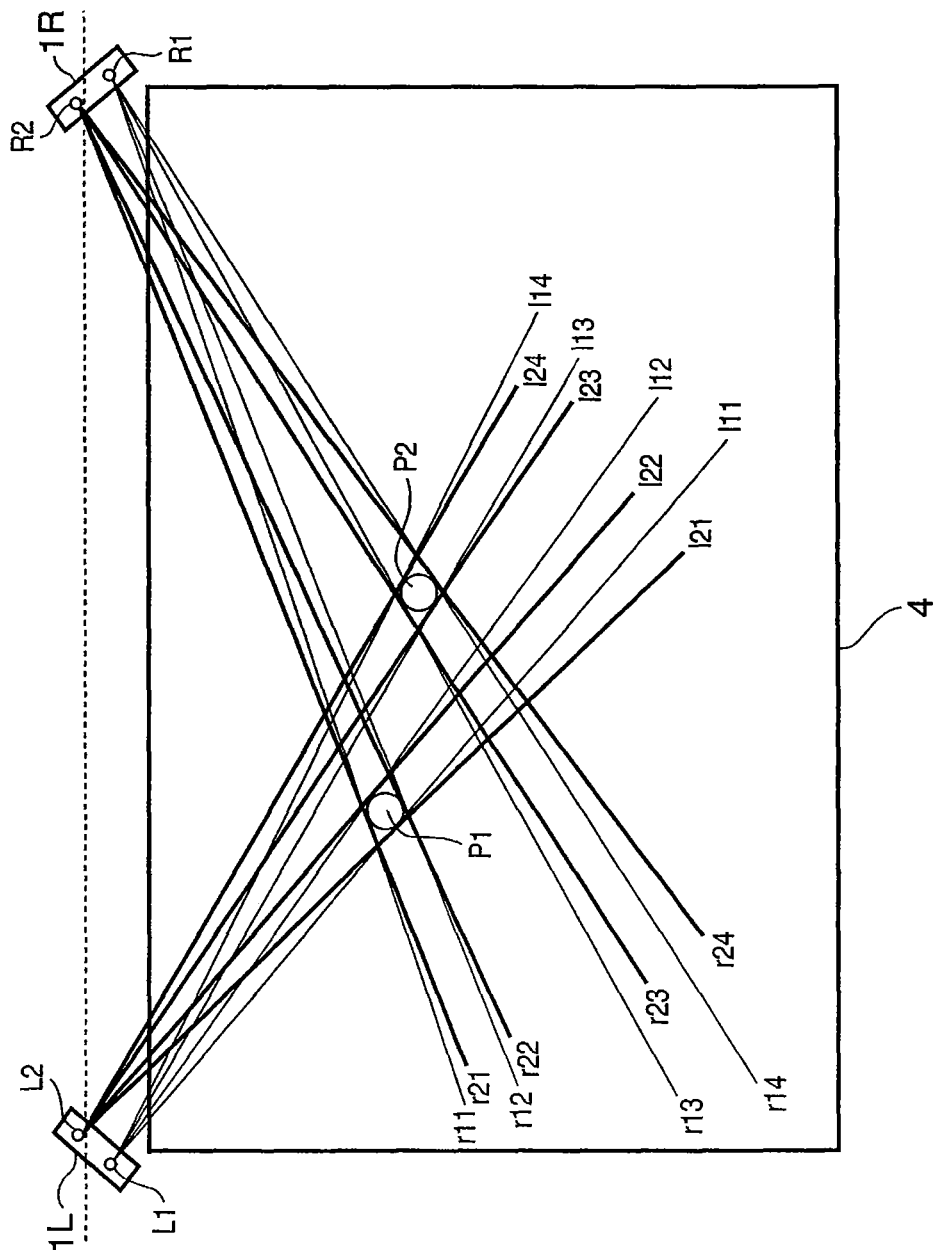
FIG. 9 is a view for explaining light-shielding range detection according to the embodiment of the present invention.
Figure 12A:
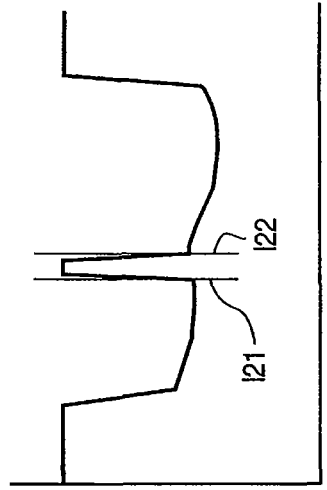
FIGS. 12A to 12D are graphs for explaining light-shielding range detection according to the embodiment of the present invention.
Figure 12B:
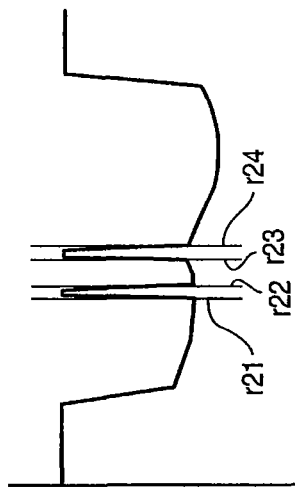
Figure 12C:
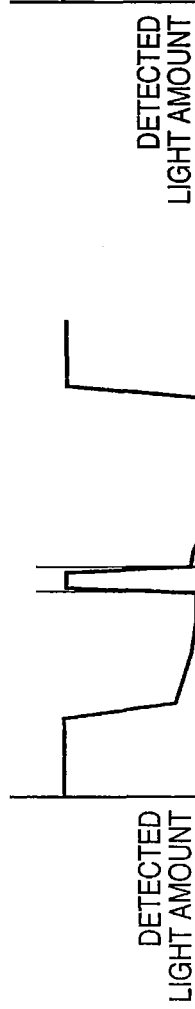
Figure 12D:
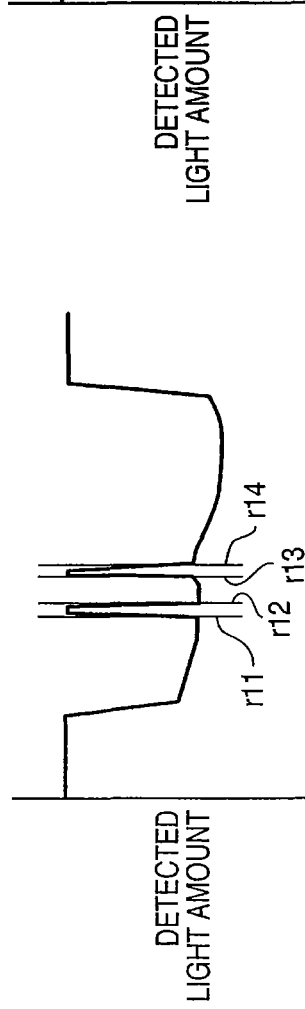

Assume that two points P1 and P2 are input, as shown in FIG. 9. The light receiving unit L1 of the sensor unit 1L corresponding to the light amount distribution of the portion A in FIG. 8 detects two light-shielding ranges, as shown in FIG. 10A. The light receiving unit L1 detects the light amount distribution data by the above-described calculation processing as pieces of light-shielding range end information 111, 112, 113, and 114, as shown in FIG. 9. Similarly, a light receiving unit R1 of the sensor unit 1R detects pieces of light-shielding range end information r11, r12, r13, and r14, as shown in FIG. 10B.

As described above, in each of the sensor units 1L and 1R, two optical systems are formed on the same line CCD while being spaced apart by a predetermined distance. Hence, the light-shielding range end information to be detected by the light receiving unit L2 can be predicted from the light-shielding range end information detected by the light receiving unit L1. More specifically, a start point is determined from the CCD pixel numbers determined by the above-described processing. The ends of the light-shielding ranges of the portion B, i.e., CCD pixel numbers corresponding to 121, 122, 123, and 124 (FIG. 10C) in FIG. 9 are determined by the same calculation processing as in the light-shielding range search processing of the portion A, and angle information is calculated.

The same light-shielding range search processing as described above is executed for the light receiving unit R2 to determine CCD pixel numbers corresponding to r21, r22, r23, and r24 (FIG. 10D) and calculate angle information. In the above-described way, the angle information of the light-shielding ends to calculate the plurality of input points P1 and P2 can be detected.

After the light-shielding range search start point is determined, the light-shielding range search processing is executed continuously until the two light-shielding range ends are detected. However, the light-shielding range search processing is not limited to this. The light-shielding ranges detected by the light receiving units L1 and L2 and light receiving units R1 and R2 are almost equal. For this reason, after one light-shielding range end is detected, data of a predetermined number of pixels (width information calculated from ends of the light-shielding range by each of the light receiving units L1 and R1) may be skipped, and the light-shielding range search processing may start again. This processing is particularly effective when the distance between an input point and a sensor unit is relatively short, and the light-shielding range is wide.

A "partial eclipse" state will be described next with reference to FIGS. 11 and 12A to 12D, in which light-shielding ranges detected by the light receiving unit L1 are recognized as one light-shielding range because the input points P1 and P2 overlap.

In this case, the light receiving unit L1 detects one light-shielding range. First, CCD pixel numbers corresponding to the ends 111 and 112 (FIG. 12A) of the light-shielding range are determined to calculate angle information. The light-shielding range search start point of the light receiving unit L2 is determined by using 111 and 112. CCD pixel numbers corresponding to the ends 121 and 122 (FIG. 12B) of the light-shielding range detected by the light receiving unit L2 are determined to calculate angle information.

Similarly, CCD pixel numbers corresponding to the ends r11, r12, r13, and r14 (FIG. 12C) of the light-shielding ranges detected by the light receiving unit R1 are determined to calculate angle information. The light-shielding range search start point of the light receiving unit R2 is determined. CCD pixel numbers corresponding to the ends r21, r22, r23, and r24 (FIG. 12D) of the light-shielding ranges detected by the light receiving unit R2 are determined to calculate angle information.

The light-shielding range search processing, i.e., CCD read is executed first for the light receiving unit L1 and then for the light receiving unit L2. However, the order is not limited to this. For example, if one of the two light receiving units can receive light all over the coordinate input effective region, and the other can secondarily receive light in a limited region of the coordinate input effective region, the light-shielding range search processing may be executed first for the data of the light receiving unit capable of receiving light all over the coordinate input effective region. This arrangement is advantageous in increasing the sampling rate if it is mainly used for simple one-point input because the light-shielding range search processing need be executed for only the data of the light receiving unit capable of receiving light all over the coordinate input effective region.

<Description of Coordinate Calculation Method>

A coordinate calculation method of calculating the position coordinates of a pointer on the basis of angle information θ converted from pixel numbers will be described next.

When the pointer inputs one point, coordinates can be calculated by using the angle of the center of the light-shielding range obtained on the basis of the output results of the sensor units 1L and 1R.

The positional relationship between coordinates defined on the coordinate input effective region 3 and the sensor units 1L and 1R and the coordinate system will be described with reference to FIG. 13.

Figure 13:
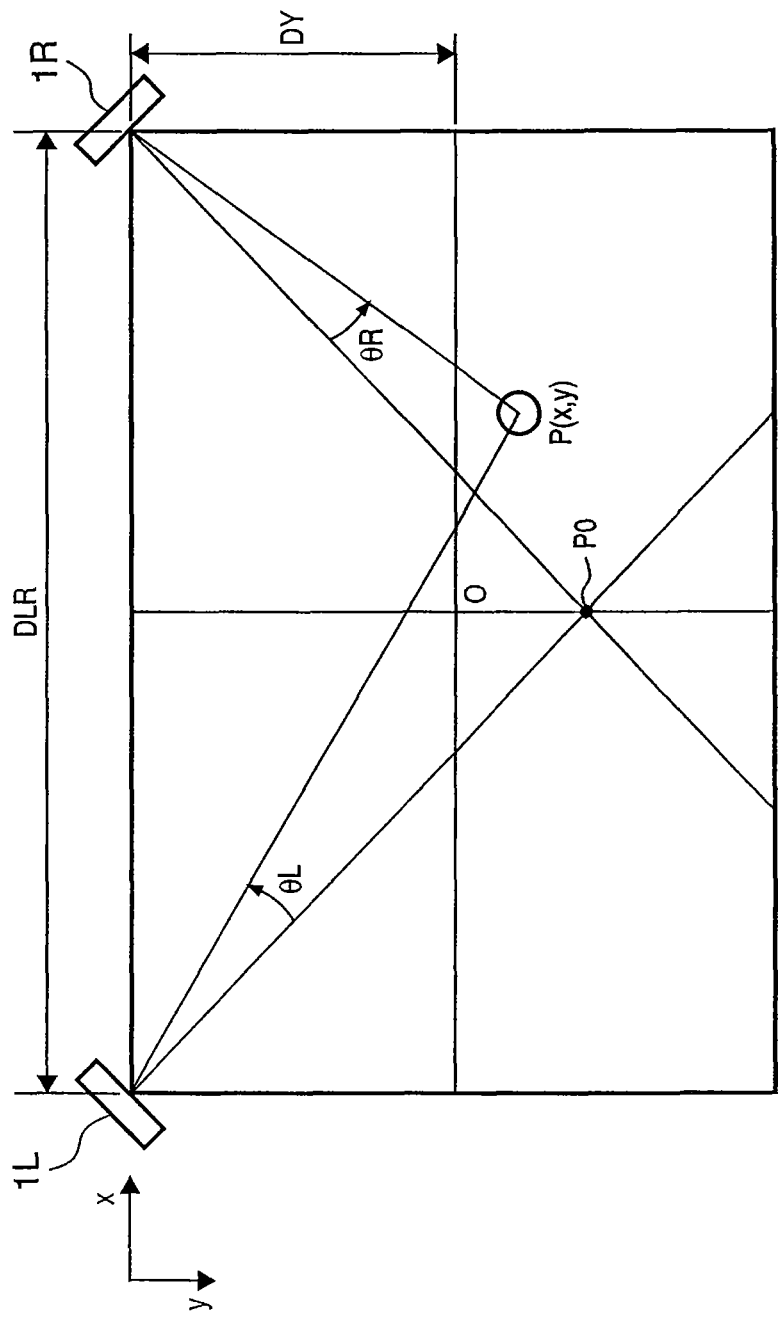
FIG. 13 is a view showing the positional relationship between coordinates defined on a coordinate input effective region and sensor units 1L and 1R according to the embodiment of the present invention.

FIG. 13 is a view showing the positional relationship between coordinates defined on the coordinate input effective region and the sensor units 1L and 1R according to the embodiment of the present invention.

Referring to FIG. 13, the X-axis is defined in the horizontal direction of the coordinate input effective region 3, and the Y-axis is defined in the vertical direction of the coordinate input effective region 3. The center of the coordinate input effective region 3 is defined to an origin position O(0,0). The sensor units 1L and 1R are attached to the left and right ends of the upper side of the coordinate input range of the coordinate input effective region 3 to be symmetrical about the Y-axis. The distance between the sensor units 1L and 1R is DLR.

The light receiving surface of each of the sensor units 1L and 1R is arranged such that its normal direction makes an angle of 45° with respect to the X-axis. The normal direction is defined as 0°.

As for the sign of the angle, the clockwise direction is defined as "+" for the sensor unit 1L arranged on the left side, and the counterclockwise direction is defined as "+" for the sensor unit 1R arranged on the right side.

P0 is the intersection of the normals to the sensor units 1L and 1R, i.e., the intersection of the reference angle. The Y-coordinate distance from the sensor unit 1L (1R) to the origin is set to DY. At this time, letting θL and θR be angles obtained by the sensor units 1L and 1R, coordinates P(x,y) of a point P to be detected are given, using tan θL and tan θR, by $$x = DLR/2 * (\tan \theta L + \tan \theta R)/(1 + (\tan \theta L * \tan \theta R)) \quad (2)$$

$$y = DLR/2 * ((1 + \tan \theta L)(1 + \tan \theta R))/(1 + (\tan \theta L * \tan \theta R)) - DY \quad (3)$$

Angle data is acquired as an angle from the reference angle. When the angle is thus set, the value tan θ falls within the range of ±π/4 so that coordinates can stably be calculated. If calculation is stable even when θ=π/2, calculation may be done by using an angle with respect to the line connecting the light receiving units at the same height (same level). For example, the following correction calculation can be done on the basis of such angle definition.

The two light receiving units of the sensor unit 1L (1R) are actually not provided on the same line with respect to the coordinate input surface. For this reason, if data of the light receiving units at different positions are to be used in calculating coordinates, the position shift need be corrected.

Figure 14:
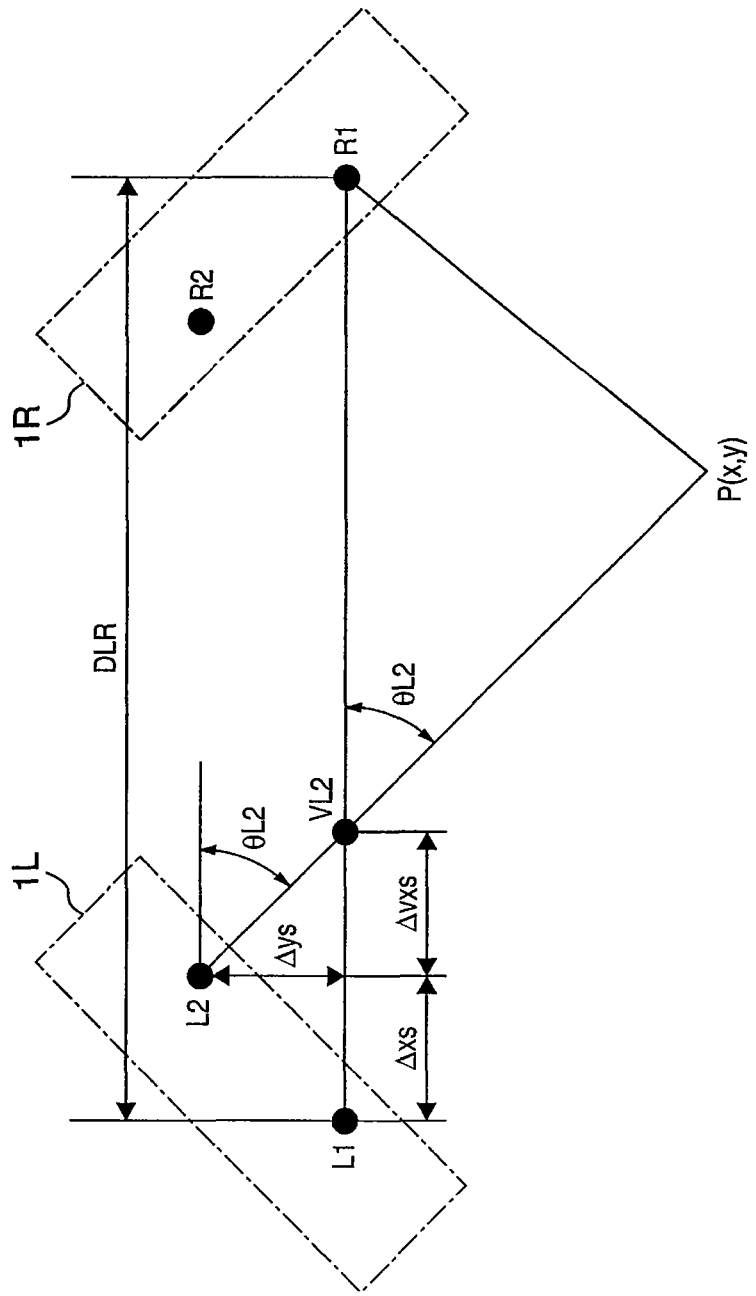
FIG. 14 is a view for explaining coordinate calculation in sensor units each having a plurality of light receiving units according to the embodiment of the present invention.

As shown in FIG. 14, let L1 and L2 be the pupil positions of the two light receiving units of the sensor unit 1L and R1 and R2 be the pupil positions of the two light receiving units of the sensor unit 1R. Let Δxs be the X-direction distance, i.e., the X-direction difference between L1 and L2, and Δys be the Y-direction distance, i.e., the Y-direction difference between L1 and L2.

Assume that data detected at L2 is θL2. The sensor unit 1L can virtually be regarded to be present at a position VL2 when viewed from the same level as R1 in the X-direction. Hence, Δvxs can be calculated by using θL2.

For conversion to the same level as R1, the distance is given, by using the distance Δys in the height direction and the obtained angle θL2, by $$\Delta vxs = \Delta ys / \tan \theta L2$$

The distance DLR between the sensor units represented by equations (2) and (3) can be corrected by the X-direction distance Δxs between the pupil positions L1 and L2 of the light receiving unit and the calculated distance Δvxs. Hence, a temporary coordinate value can be calculated. The x-coordinate of the temporarily calculated coordinate value is calculated by setting the intermediate point between VL2 and R1 to the origin. When (Δxs+Δvxs)/2 is further corrected on the basis of the x-coordinate, coordinates can be calculated by using the data of the light receiving unit at a different position.

When one point is input, coordinates can be calculated even by using the angle of the center of the light-shielding width (light-shielding range). However, this method cannot be used for calculation if there are inputs from a plurality of pointers, and the light receiving units and the pointers are positioned such that detection signals (light amount distributions (light-shielding ranges)) of the two light receiving units in the sensor unit 1L overlap, as shown on the upper side of FIG. 15.

Figure 15:
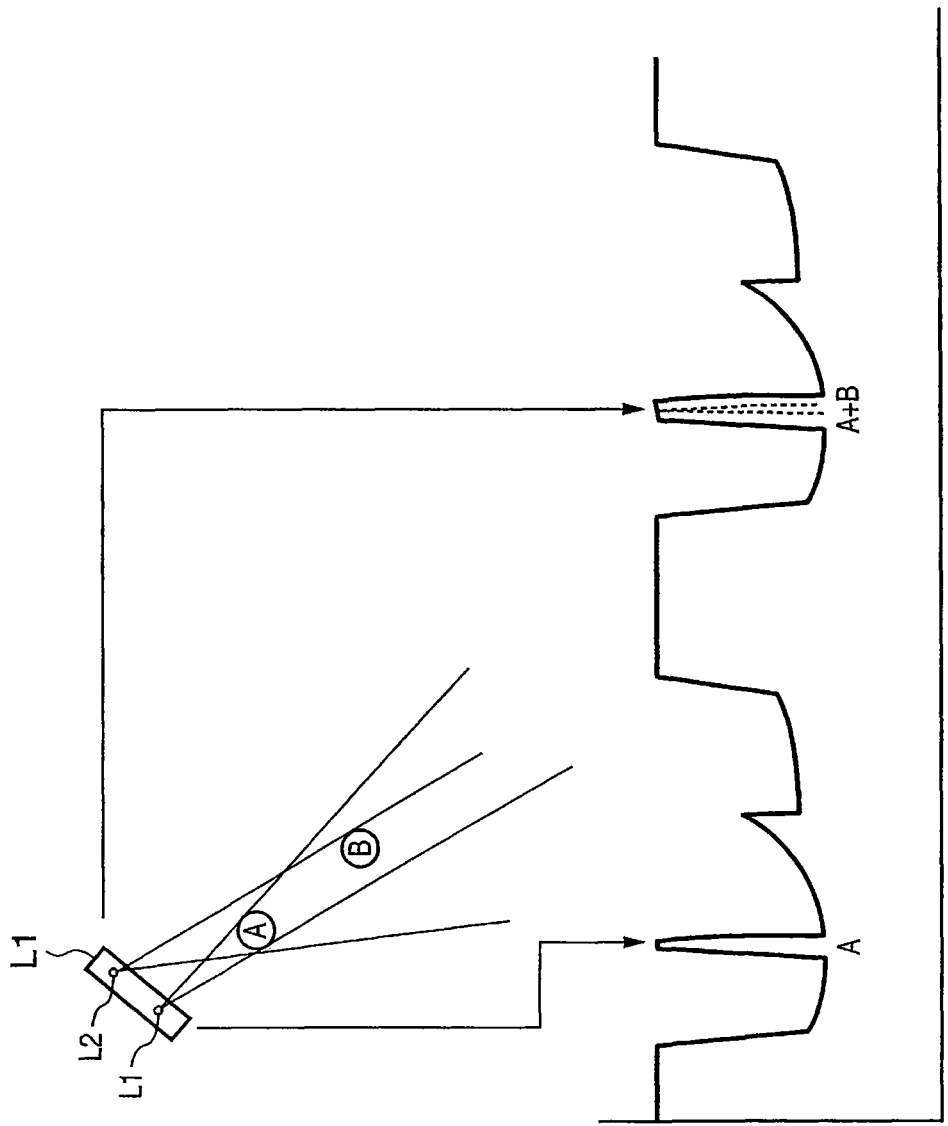
FIG. 15 is a view showing an example of the positional relationship and detection signal in an input operation from a plurality of pointers according to the embodiment of the present invention.

For example, in the state shown on the upper side of FIG. 15, the pointer B is completely hidden by the shadow of the pointer A for the left light receiving unit L1 of the sensor unit 1L. For the other light receiving unit L2, the light-shielding ranges of the pointers B and A continue.

The output signal at this time is shown on the lower side of FIG. 15. The output signal from the light receiving unit L1 contains only the light-shielding range A of the pointer A. The output signal from the light receiving unit L2 indicates that the light-shielding ranges A+B of the pointers A and B are connected. In such a case, accurate input coordinates cannot be calculated by the method using the center of the light-shielding range.

In this case, coordinates are calculated by using the angle information of the ends of light-shielding ranges detected by the sensor units 1L and 1R.

Figure 16:
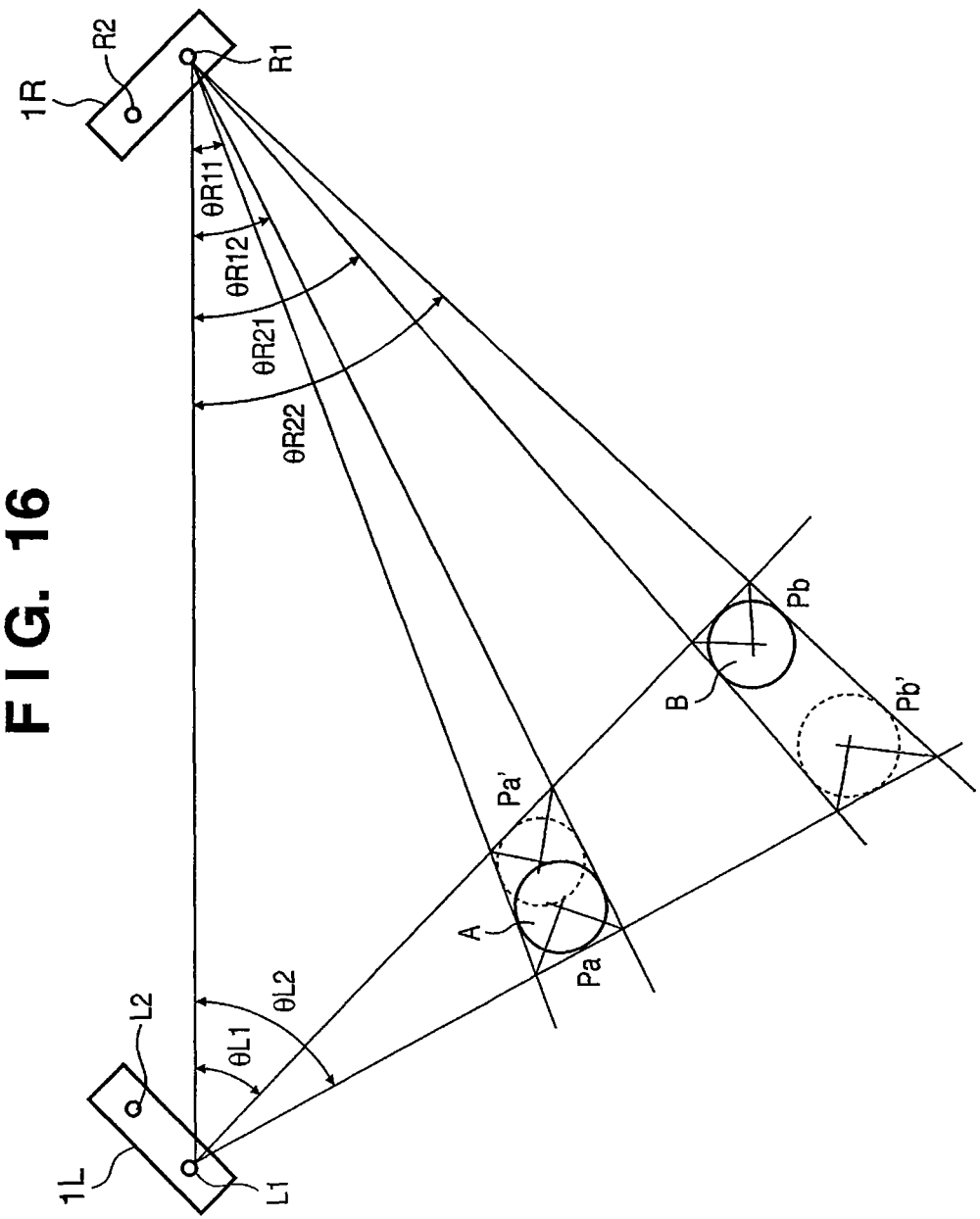
FIG. 16 is a view for explaining truth determination according to the embodiment of the present invention.

The input shape of the pointer is almost circular. Assume that the pointers A and B partially overlap with respect to one light receiving unit L1 in the sensor unit 1L, as shown in FIG. 16. That is, the light receiving unit L1 observes a light-shielding range defined by θL1 and θL2.

Of the pieces of angle information of the ends of two light-shielding ranges obtained by each light receiving unit, the minimum angle θL2 in the light receiving unit L2 and the maximum angle θL1 in the light receiving unit L1 with respect to angles viewed from the horizontal direction are selected.

Angles observed by, e.g., the light receiving unit R1 in the sensor unit 1R correspond to the ends of light-shielding ranges formed by the pointers. Four angles θR11 to θR22 are observed.

Figure 17:
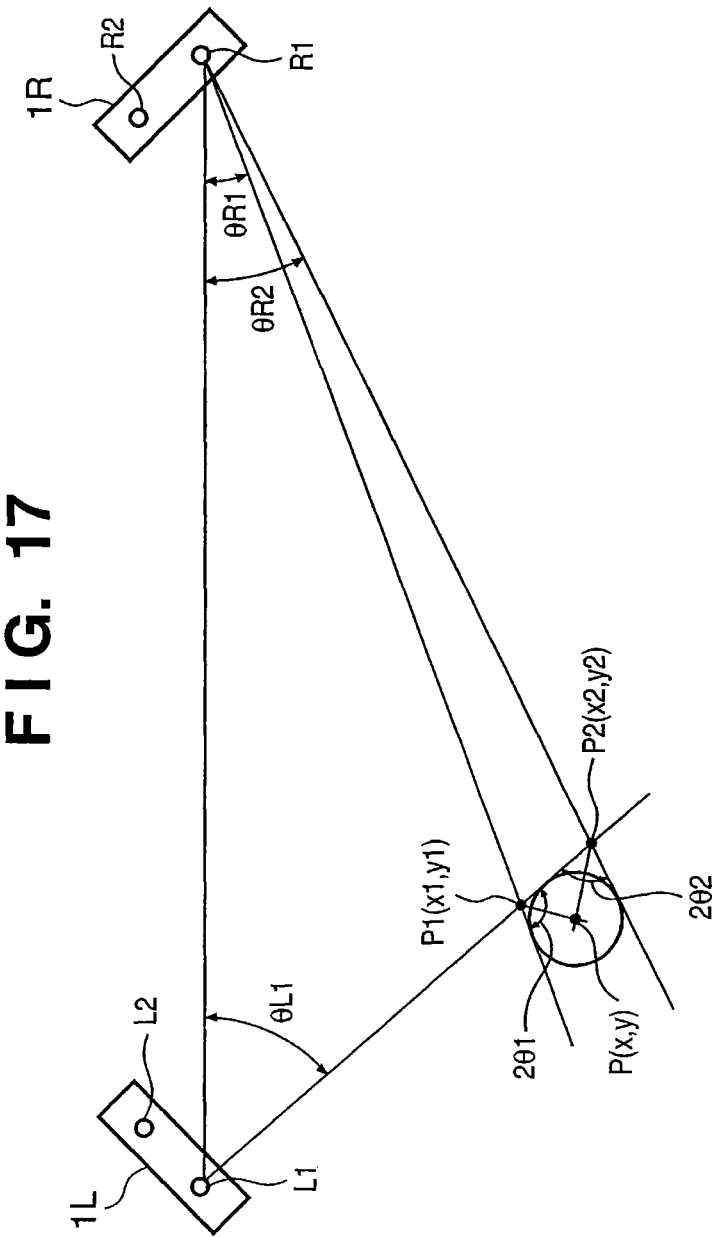
FIG. 17 is a view for explaining an example of coordinate calculation based on the end information of a light-shielding range according to the embodiment of the present invention.

FIG. 17 is a view for explaining coordinate calculation using the ends of a light-shielding range.

For example, assume that the point P is input. Let P1(x1, y1) and P2(x2,y2) be the intersections between θL1, θR1, and θR2. The coordinate point P of the input position can be calculated as the intersection of bisectors of angles 2θ1 and 2θ2 at the respective intersections.

The coordinate values of P1 and P2 can be calculated by the same equations (2) and (3) as those used to calculate the above-described coordinates of the intersections of the angles. Hence, the input coordinates P(x,y) can be calculated by using the coordinate values and angle information.

As described above, when the pieces of end information of light-shielding ranges detected by the left and right sensor units 1L and 1R are used, the coordinates of an input point can be calculated without using the median of the light-shielding range.

Figure 18:
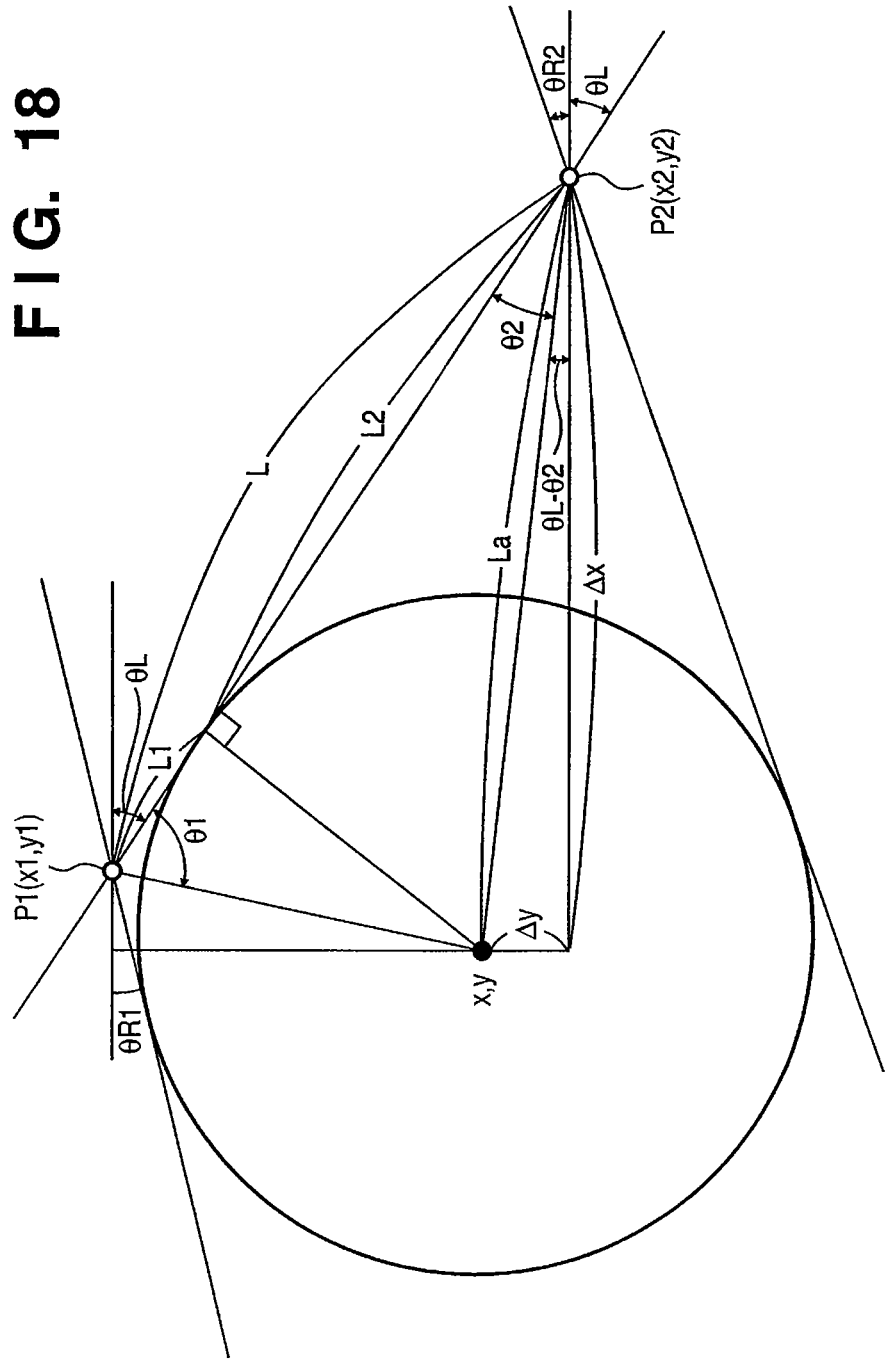
FIG. 18 is a view for explaining the relationship between the coordinate values and the bisectors of a light-shielding range end information (angle) overlap portion according to the embodiment of the present invention.

FIG. 18 is a view for explaining an example of the calculation procedure.

As shown in FIG. 18, let L be the distance between the points P1(x1,y1) and P2(x2,y2), and θ1 and θ2 be the angles of bisectors of the angles at these points.

$$L = ((x2-x1)^2 + (y2-y1)^2)^{0.5} \quad (4)$$

$$\theta1 = (\pi - (\theta L + \theta R1))/2 \quad (5)$$

$$\theta2 = (\theta L + \theta R2)/2 \quad (6)$$

In this case, $$L1 \cdot \tan\theta1 = L2 \cdot \tan\theta2 \quad (7)$$

Hence, $$L2 = L1 \cdot \tan\theta1/(\tan\theta1 + \tan\theta2) \text{ (where } \tan\theta1 + \tan\theta2 \neq 0) \quad (8)$$

$$La = L2/\cos\theta2 \text{ (where } \cos\theta2 \neq 0) \quad (9)$$

From the above conditions, Δx and Δy are given by $$\Delta x = La \cdot \cos(\theta L - \theta2) \quad (10)$$

$$\Delta y = La \cdot \sin(\theta L - \theta2) \quad (11)$$

The input coordinates P(x,y) are given by $$x = x2 - \Delta x \quad (12)$$

$$y = y2 - \Delta y \quad (13)$$

In a partial eclipse state as shown in FIG. 16, i.e., when the input point on the rear side viewed from, e.g., the sensor unit 1L is not completely hidden by a shadow, unlike a total eclipse state, the input points are defined by the combination of points Pa and Pb or points Pa' and Pb'.

The above-described calculation corresponding to the intersection of bisectors is executed for combinations of θL1, θL2, θR11, θR12, θR21, and θR22. The coordinates of points Pa and Pb or points Pa' and Pb' are calculated, and the combination corresponding to the correct input coordinates is determined.

The combination can be determined by using angle information different from those selected by the light receiving units L1 and L2 in FIG. 16.

Figure 19:
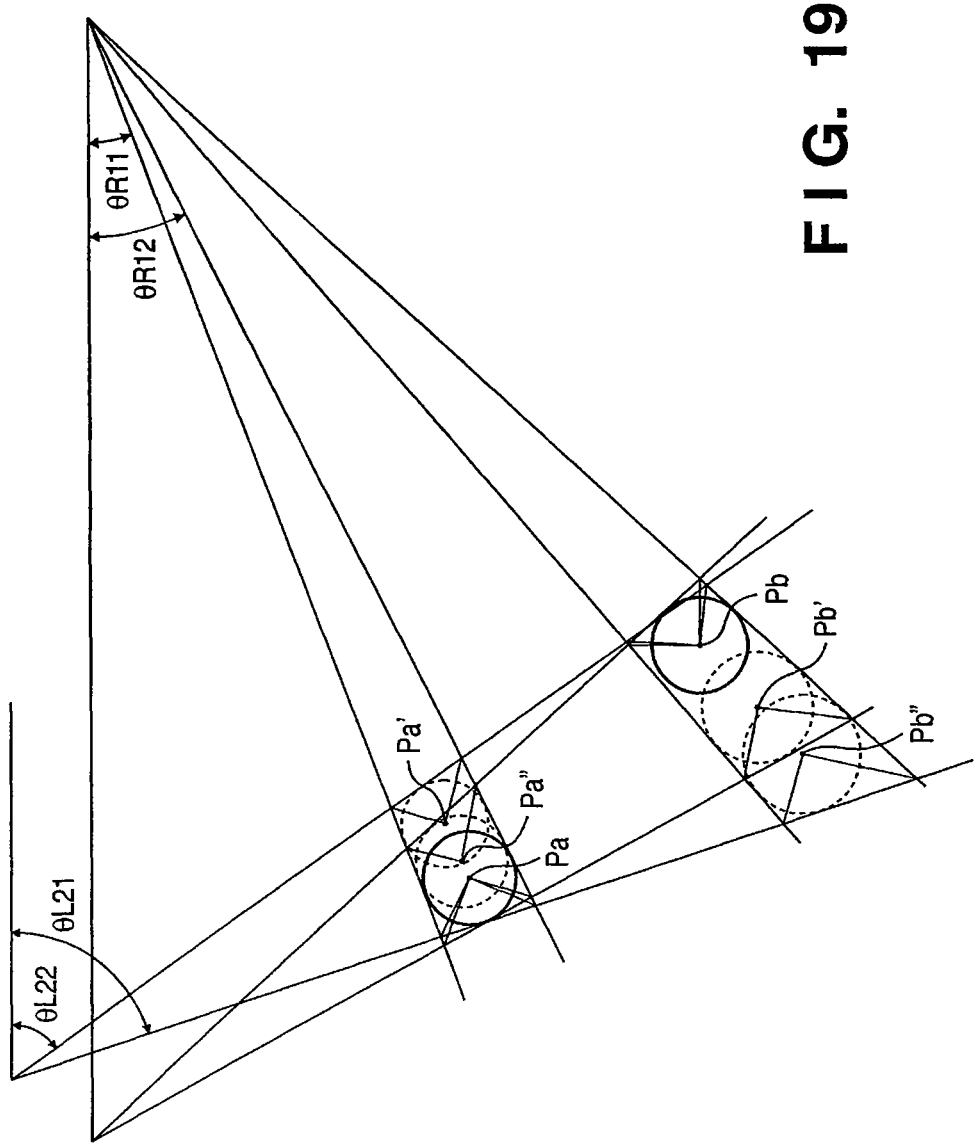
FIG. 19 is a view for explaining truth determination according to the embodiment of the present invention.

For example, as shown in FIG. 19, the coordinate calculation result by data θL21 and θL22 of the other light receiving unit and θR11 and θR12 is compared with the coordinate calculation result by the above-described light receiving units. As a result of the comparison, whether the data overlaps Pa or Pa' is determined on the basis of the distances of the points, thereby determining which one of Pa and Pa' is correct. If Pa is employed, Pb is automatically employed as a counterpart.

For more reliable calculation, calculation may be executed for Pb by using the coordinate calculation result by θR21 and θR22.

As described above, in the "partial eclipse" state in which two light-shielding ranges detected by the sensor unit 1L (1R) partially overlap, the angles of the ends of the light-shielding ranges are detected. Pieces of information corresponding to bisectors at the intersection are obtained. Hence, a plurality of input point positions can be specified.

In the so-called "total eclipse" state, the position of the input of a pointer hidden by a shadow cannot be specified even by using the end information of light-shielding ranges. To avoid the "total eclipse" state, the distance between the plurality of light receiving units in each sensor unit 1L (1R) is set to an optimum value. In this case, the "partial eclipse" state wherein the regions partially overlap can be obtained in one optical system.

In the present invention, the optical layout of the light receiving units in the sensor unit 1L (1R) is set in consideration of this situation. More specifically, at least one of the two light receiving units provided in the sensor unit 1L (1R) can always detect a "partial eclipse" state or two separated light-shielding ranges regardless of the regions of a plurality of pointers.

As already described above, when both light receiving units in one sensor unit are in an "eclipse" state, a single light-shielding range is detected by both light receiving units of one sensor unit. The number of light-shielding ranges detected by both light receiving units in one sensor unit can be one even in a state (input transient state) until a pointer reaches the input surface and completely forms a shadow. Hence, to calculate the correct coordinates of the pointer, whether it is in an "eclipse" state or "input transient state" must be determined.

Actual calculation will be described below.

As described above, light amount distribution data is acquired from each light receiving unit.

The number of light-shielding ranges is calculated on the basis of the obtained light amount distribution data by using a threshold value or the like. On the basis of the number of light-shielding ranges, a case without input, a case wherein input (single point input) is done at one portion, and a case wherein input (multiple point input) is done at least at two portions can be determined, and data to be used for calculation can also be selected.

FIG. 20 shows combinations of the numbers of light-shielding ranges detected by the light receiving units, in which L1 and L2 represent the two light receiving units in the sensor unit 1L, and R1 and R2 represent the two light receiving units in the sensor unit 1R. When the maximum number of inputs is 2, there are 17 possible combinations of the numbers of light-shielding ranges including a case without input.

However, the number of light-shielding ranges cannot be determined in the input transient state.

When a pen having, e.g., a signal generation unit such as a switch at its distal end is used as a pointer, the input transient state can be determined on the basis of pen-down information (pen-down signal) obtained from the pointer. The signal generation unit generates the pen-down information when the distal end of the pointer contacts the surface of the coordinate input effective region 3 or the pointer is pressed in the pointing direction in contact with the coordinate input effective region 3.

A detection error in the input transient state often occurs because reaction in the depth direction of the coordinate input effective region 3 changes in inserting the pointer in the coordinate input effective region.

If the pointer reaches the pen-down state, it can be determined as an almost light-shielding state. Only in this state wherein pen-down is confirmed at a predetermined count, no pointer is in the input transient state. In this case, coordinate output is permitted to suppress errors in the input transient state.

Since a pointer outputs signals such as an ID signal in addition to the pen-down signal, how many pointers have reached the pen-down state can be obtained. Whether a pointer is in the input transient state can be determined on the basis of the number of pen-down pointers and the number of light-shielding ranges detected by sensor units.

Let NL1 and NL2 be the numbers of light-shielding ranges respectively detected by the light receiving units L1 and L2 of the sensor unit 1L, and NR1 and NR2 be the numbers of light-shielding ranges respectively detected by the light receiving units R1 and R2 of the sensor unit 1R. When each of the light receiving units L1, L2, R1, and R2 detects two shadows, [NL1,NL2,NR1,NR2]=[2222].

Combinations in which a fear of the input transient state is present are [NL1,NL2,NR1,NR2]=[1111], [1122], and [2211]. If each of the sensor units 1L and 1R detects two shadows, as represented by [2112] or [1222], coordinate calculation is possible from two-shadow combinations, and it can be determined that no pointer is in the input transient state.

[NL1,NL2,NR1,NR2]=[1111] means a state wherein both the left and right sensor units 1L and 1R detect one pointer, or a state wherein each of the left and right sensor units 1L and 1R detects one of two pointers. If a pen-down signal from one pointer is detected in this state, it can be determined that this pointer is not in the input transient state. Thus, it can be determined that input by one pointer is done, and coordinates can be calculated and output.

For [NL1,NL2,NR1,NR2]=[1122] or [2211], two shadows (light-shielding ranges) have reliably been detected, but which of the partial eclipse state and input transient state has occurred cannot be determined. This situation cannot be determined when a pen-down signal is output from one pointer or none. Only when pen-down signals from two pointers are detected, it can be determined that one pointer is in an eclipse state, and accurate coordinate calculation can be achieved.

In this manner, whether a pointer is in the input transient state can be determined from the numbers of light-shielding ranges detected by the left and right sensor units 1L and 1R and the number of pointers which have output detected pen-down signals. It can be determined that no pointer is in the input transient state if the same number of pen-down pointers as the maximum number of obtained light-shielding ranges can be confirmed. If it is determined that no pointer is in the input transient state, coordinate calculation is executed on the basis of the number of light-shielding ranges.

When the input is "1" in all the light receiving units L1, L2, R1, and R2, single point input and contact of two inputs are possible. In the embodiment, the contact will also be handled as single point input. However, if the shape information of a pointer such as the input width of a pointer is known, contact of two inputs may be detected on the basis of the shape information.

When the number of light-shielding ranges is counted, the input state can be determined as "no input", "single point input", or "multiple point input". In "single point input" wherein only one light-shielding range is detected by each sensor unit, coordinate calculation may be done by the coordinate calculation method using the end information of the light-shielding range. Alternatively, coordinate calculation may be executed by calculating the center of the light-shielding range as usual.

In "multiple point input", two light-shielding ranges are detected as separate inputs, or one light-shielding range is detected because of the "eclipse" of input positions with respect to a sensor unit.

In this case, the combination of light-shielding ranges to be used for coordinate calculation is determined from the number of light-shielding ranges.

First, a light receiving unit that has detected two light-shielding ranges is selected. The detection signal from the selected light receiving unit is defined as coordinate-calculation first data. If a plurality of light receiving units have detected two light-shielding ranges, one of them is selected in accordance with a predetermined priority order.

Next, give attention to the detection signals of the light receiving units in the sensor unit different from the sensor unit including the light receiving unit selected as coordinate-calculation first data. Of the pieces of angle information of the ends of the plurality of light-shielding ranges obtained by each light receiving unit, angle information representing the minimum angle in the light receiving unit L2 (or R2) and angle information representing the maximum angle in the light receiving unit L1 (or R1) with respect to angles viewed from the horizontal direction are selected as coordinate-calculation second data. that is, of the plurality of pieces of end information detected by the sensor unit, the pieces of angle information of two ends are selected as coordinate-calculation second data.

Of the pieces of angle information of the ends of the plurality of light-shielding ranges obtained by each light receiving unit in the very sensor unit that includes the light receiving unit selected as coordinate-calculation second data, for example, angle information representing the maximum angle in the light receiving unit L2 (or R2) and angle information representing the minimum angle in the light receiving unit L1 (or R1) with respect to angles viewed from the horizontal direction are selected as truth determination data.

This data is used to determine true coordinates because, in the multiple point input mode, imaginary coordinates generated by a combination of detection signals are calculated in addition to actually input coordinates (true coordinates), as described above.

As shown in FIG. 20, a plurality of light-shielding ranges are always detected by the light receiving unit selected as the coordinate-calculation first data. However, the light receiving unit selected as the coordinate-calculation second data detects a single light-shielding range or a plurality of light-shielding ranges. That is, there are three types: both of the light receiving units in the sensor unit selected as the coordinate-calculation second data detect a single light-shielding range, one of the light receiving units detects a single light-shielding range (one of the light receiving units detects a plurality of light-shielding ranges), and both of the light receiving units detect a plurality of light-shielding ranges.

Figure 21C:
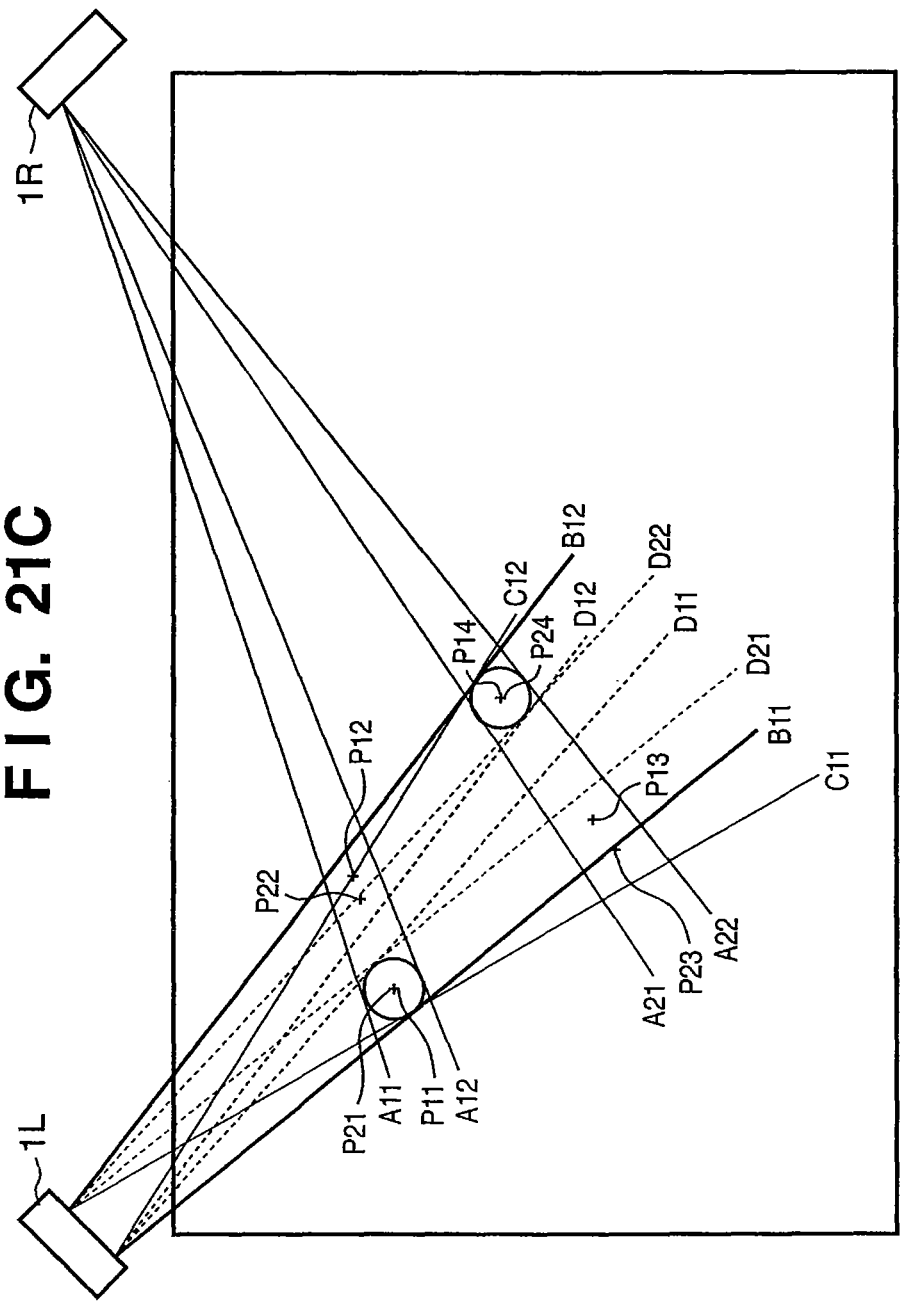
FIG. 21C is a view for explaining an example of coordinate calculation based on light-shielding range end information according to the embodiment of the present invention.

FIGS. 21A to 21C show examples of input states corresponding to the three types.

Referring to FIGS. 21A to 21C, tangents A indicate coordinate-calculation first data, tangents B indicate coordinate-calculation second data, tangents C indicate truth determination data, and tangents D indicate truth determination spare data (FIGS. 21B and 21C).

First, coordinate calculation is executed by using the above-described end information of light-shielding ranges on the basis of a combination of one light-shielding range of the coordinate-calculation first data, e.g., A11 and A12 in FIG. 21A and the coordinate-calculation second data B11 and B12 and truth determination data C11 and C12.

Let P11 and P12 be the coordinate values calculated by the coordinate-calculation second data B11 and B12, and P21 and P22 be the truth determination coordinate values calculated by the truth determination data C11 and C12. At least two of the four calculated coordinate values almost equal and indicate the position coordinates of a pointer.

The light receiving unit selected as the coordinate-calculation second data in the sensor unit detects a plurality of light-shielding ranges or a single light-shielding range. When both light receiving units detect a single light-shielding range, a "total eclipse" state can be included in one of the light receiving units. In this case, some selected angle information can be used for coordinate calculation on a side near to the sensor unit but not for a far side.

However, as described above, of the plurality of pieces of light-shielding range end information of the selected sensor unit, pieces of angle information corresponding to the data of the two ends are selected as the coordinate-calculation second data. Hence, coordinate candidates can be calculated accurately regardless of a partial or total eclipse.

Next, truth determination of coordinates is executed. This processing may be executed after the coordinates of all combinations are calculated. However, when truth determination is executed for one coordinate value in advance, the processing time can be shortened by omitting unnecessary coordinate calculation.

Which one of the coordinate values P11, P12, P21, and P22 is correct is determined on the basis of the distances therebetween.

The distances between the point P11 and the points P21 and P22 and the distances between the point P12 and the points P21 and P22 are calculated. One of P11 and P12 is selected from the nearest combination as a true coordinate value.

If P11 is selected as the true coordinate value by the truth determination, the remaining uncalculated coordinate value is P14. The coordinate value is calculated. If P12 is selected as the true coordinate value by the truth determination, the coordinates of P13 are calculated.

In this way, the coordinates of an actual input can be determined (truth determination).

Even in the cases shown in FIGS. 21B and 21C, coordinate calculation can be done by executing the same processing as described above. In coordinate calculation, when each of the two light receiving units of one sensor unit detects a plurality of light-shielding ranges, coordinates may be calculated on the basis of either both pieces of end information of the light-shielding ranges or only a piece of end information. Alternatively, the center of a light-shielding range may be calculated and used for coordinate calculation as usual.

Truth determination may be executed by using the angle information of the truth determination spare data D as needed.

Data assignment depending on the number of light-shielding ranges detected by each light receiving unit in a sensor unit will be described. Which light receiving unit and angle information of each sensor unit should be assigned to the coordinate-calculation first data, coordinate-calculation second data, and truth determination data can be calculated by using any one of the combination of L1 and R1 and the combination of L2 and R2 in the single point input mode.

When both of the two light receiving units in each sensor unit detect a plurality of light-shielding ranges, any one of the detection signals can be used as the coordinate-calculation first data.

<Determination of Continuity of Coordinate Values>

As described above, when sensor units each including a plurality of light receiving units are used, and coordinate calculation and truth determination of coordinates are executed by using the end information of light-shielding ranges, the coordinate values of a plurality of inputs can be determined.

When the plurality of obtained coordinate values are directly output, the receiving-side external terminal may make no distinction between the coordinate values and connect them.

To discriminate two coordinate values, an identifier that indicates the continuity of coordinates is added to each coordinate value to be output.

The continuity of a plurality of coordinate values can be determined by calculating the difference from a previous coordinate value in every sampling and selecting a closer coordinate value.

When a light-shielding range is detected for the first time, e.g., an ID number (flag) is added in the order of detection.

Figure 22:
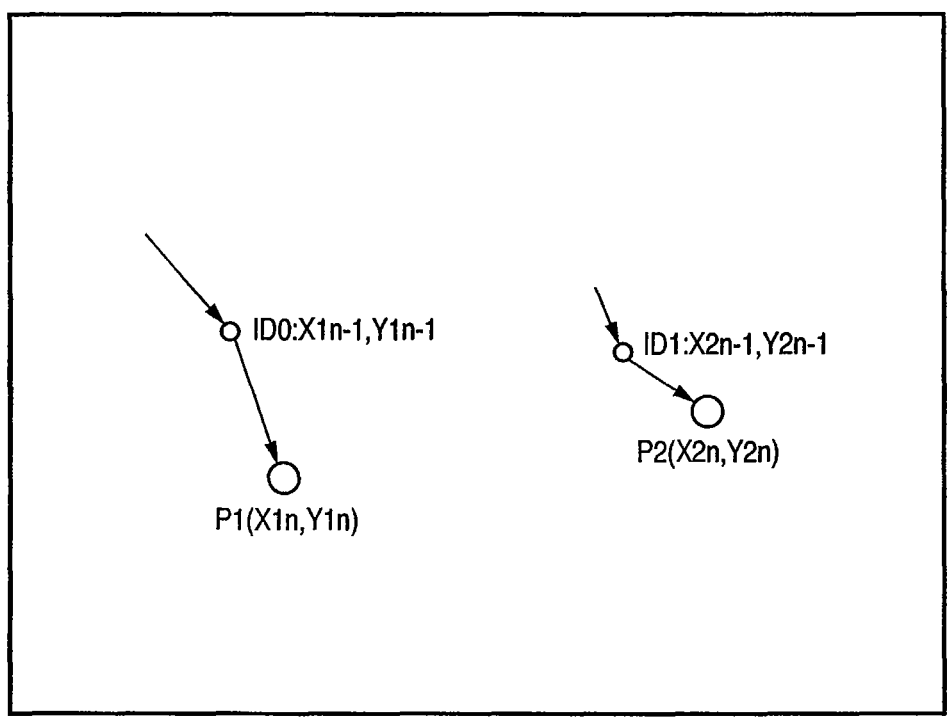
FIG. 22 is a view for explaining coordinate continuity determination according to the embodiment of the present invention.

The following processing is executed when two coordinate values $P1(X1n,Y1n)$ and $P2(X2n,Y2n)$ are obtained, as shown in FIG. 22. More specifically, if coordinate values in the previous sampling are $ID0:X1n-1,Y1n-1$ and $ID1:X2n-1,Y2n-1$, the differences between each previous coordinate value and the coordinate values P1 and P2 are calculated, and closer coordinate values are employed. P1 is set to ID0, and P2 is set to ID1. In this way, the continuity of coordinate values is determined, and each coordinate value assigned an ID is output.

The external terminal side determines the continuity of coordinate values by referring to the IDs and executes drawing processing by, e.g., connecting the two points by a line.

<Detection of Pen Signal>

When a pen having, e.g., a signal generation unit such as a switch at its distal end is used as a pointer, smooth input can be performed without a problem of "tailing" in, e.g., character input.

"Tailing" is a phenomenon that in inputting, e.g., character "A", excess loci are displayed immediately before and after touch on the coordinate input surface, and loci different from those intended by the operator are displayed.

Information output from the coordinate input apparatus to the external terminal includes not only coordinate values, as described above, but also switch information obtained from the pointer and the above-described identifier ID representing the continuity of coordinates. Pen ID information unique to each pointer is also included. The switch information includes up-down information S0 corresponding to, e.g., the information of the left button of a mouse and pen side switch information S1 corresponding to the right button of a mouse.

The switch information can be output by using a sonic wave, radio wave, or light.

The pen signal receiving unit 5 shown in FIG. 1 receives a signal from a pointer and determines the coordinate value indicated by the signal. The signal is used as a pen up-down signal in transmitting a coordinate value or a button signal of a mouse.

Assignment of information from a pointer to a coordinate value is executed in the following way. When, e.g., light is used, a plurality of pen signal receiving units are provided in correspondence with the coordinate input effective region 3 to obtain signals from different regions.

In this arrangement, when coordinate values by a plurality of pointers are obtained, one of the different regions which corresponds to each coordinate value is determined. Information (switch signal or pen ID information of the pointer) of the signal obtained in that region is associated with the coordinate value. The switch information, pen ID information unique to the pointer, or ID information representing the continuity of coordinate values is added to the coordinate value as supplementary information and output to the external terminal.

FIG. 23 shows format examples in outputting such supplementary information and a coordinate value.

Referring to FIG. 23, switch information and pen ID information are added to byte0 as supplementary information. The coordinate values of coordinates (x,y) as the point position of the pointer are stored in byte1 to byte4 and output to the external terminal. The external terminal side analyzes the received data and controls execution of locus drawing and menu operation.

<Description of Coordinate Calculation Processing Flow>

Figure 24:
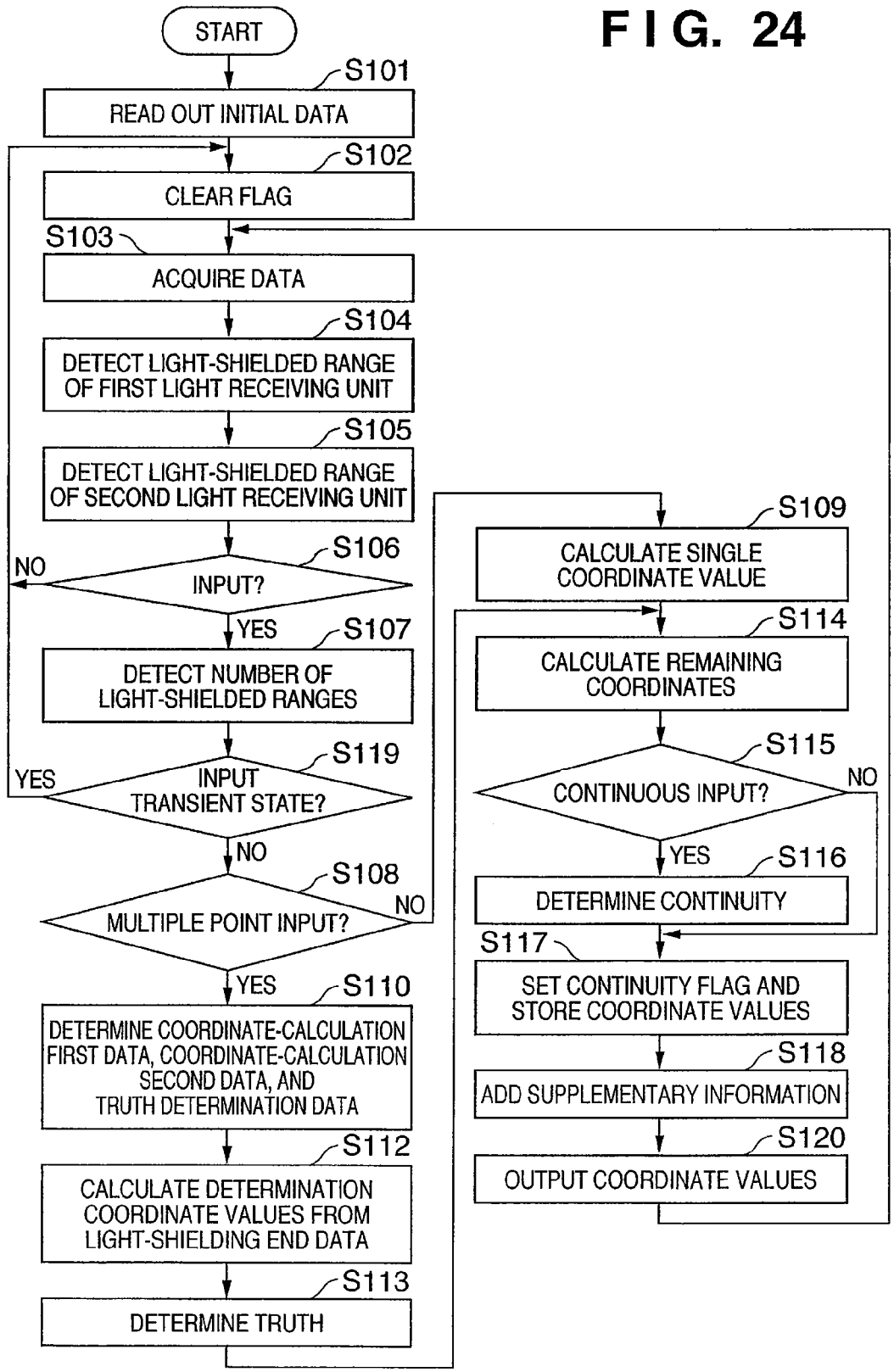
FIG. 24 is a flowchart showing coordinate calculation processing executed by the coordinate input apparatus according to the embodiment of the present invention.
Figure 26:
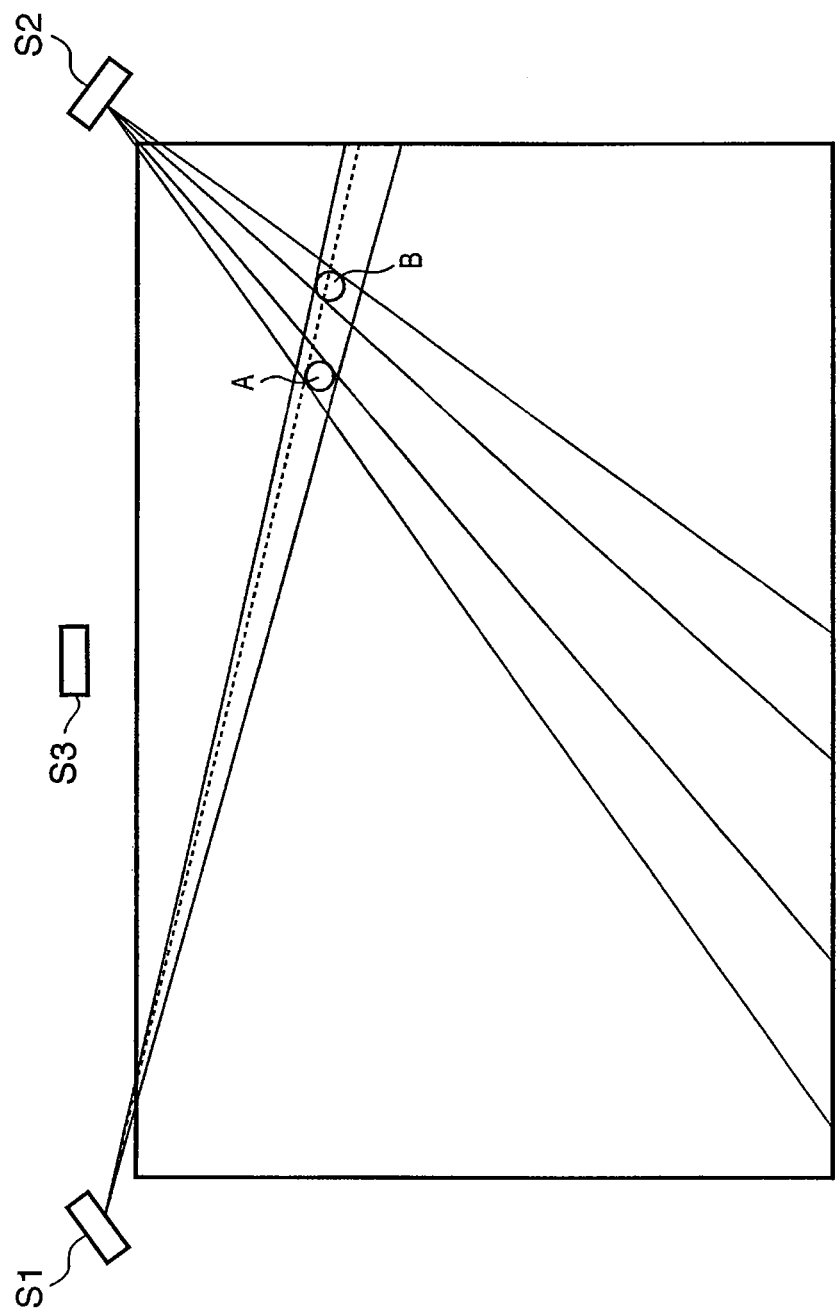
FIG. 26 is a view for explaining the relationship between sensor unit positions and light-shielding ranges in two-point input according to a prior art.
Figure 28:
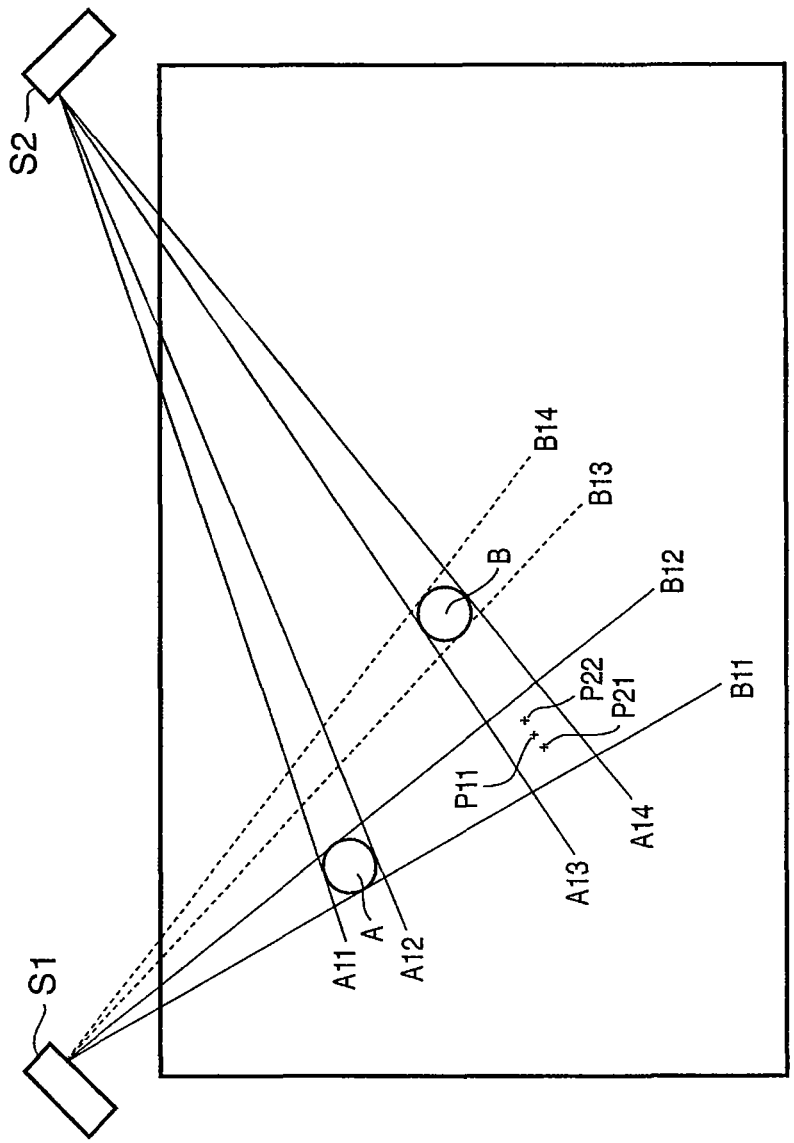
FIG. 28 is a view for explaining an example of an input transient state according to a prior art.

FIG. 24 is a flowchart showing coordinate calculation processing executed by the coordinate input apparatus according to the embodiment of the present invention.

FIG. 24 shows procedures from data acquisition to coordinate calculation in the sensor unit.

When the apparatus is powered on, various kinds of initialization of the coordinate input apparatus are executed in step S101, including port setting and timer setting of the control/arithmetic unit 2. Initial data such as reference data and correction constants are read out from a nonvolatile memory and the like and stored in the memory 132 of the control/arithmetic unit 2.

The light amount distribution data 81 without illumination and the light amount distribution data 82 without initial input as shown in FIG. 6 are acquired for each sensor unit and stored in the memory 132 as initial data.

The above-described processing is the initial setting operation upon power-on. This initial setting operation may be performed in accordance with the operator's discretion by operating, e.g., a reset switch provided on the coordinate input apparatus. Next to the initial setting operation, a coordinate input operation by a normal pointer starts.

In step S102, a flag representing whether coordinate input is continuously executed is initialized (cleared). In step S103, the light projecting units of each sensor unit are turned on, and the light receiving units acquire light amount distribution data.

In step S104, the difference and ratio of the light amount distribution data acquired by one (first light receiving unit) of the two light receiving units in each of the sensor units 1L and 1R to the above-described initial data are calculated. Light-shielding range detection is executed by, e.g., determining whether the difference or ratio exceeds a threshold value.

In step S105, the light-shielding range search start point (pixel number) of data corresponding to the other light receiving unit (second light receiving unit) is calculated on the basis of the angle information of the light-shielding range detected in step S104. The light-shielding range of the data of the other light receiving unit is detected, as in step S104.

In step S106, the presence/absence of input by the pointer is determined on the basis of the light-shielding range detection result. If no input is present (NO in step S106), the processing returns to step S101. If an input is present (YES in step S106), the processing advances to step S107.

In step S107, the number of light-shielding ranges for each light receiving unit of the sensor units is detected on the basis of the light-shielding range detection result.

In step S119, the input transient state is determined. In the input transient state (YES in step S119), the processing returns to step S102. If it is not the input transient state (NO in step S119), the processing advances to step S108.

It is determined that no pointer is in the input transient state if the maximum number of light-shielding ranges equals the number of pen-down pointers as a result of comparison between the number of pen-down pointers and the number of light-shielding ranges. That is, it is determined that the input state is proper (valid input state). If it is determined that a pointer is in the input transient state, the processing returns to the data acquisition operation.

In step S108, it is determined on the basis of the input transient state determination result and the detection result of the number of light-shielding ranges whether the input by the pointer is multiple point input. If the input is not multiple point input (NO in step S108), i.e., the input is single point input, the processing advances to step S109 to execute coordinate calculation in the single point input mode. Coordinate calculation at this time can be executed by using either the end information of the light-shielding range or the center of the light-shielding range.

If the input is multiple point input (YES in step S108), the processing advances to step S110 to determine coordinate-calculation first data, coordinate-calculation second data, and truth determination data in accordance with the number of light-shielding ranges. These data are stored in the memory 132.

In step S112, the end data of each light-shielding range is calculated. Coordinate values and determination coordinate values are calculated from the end data.

When a plurality of light-shielding ranges (input points) are detected, actually input real points and imaginary points are calculated as coordinate values. In step S113, truth determination of coordinate values is executed on the basis of the coordinate values and determination coordinate values.

When true coordinates are determined by truth determination, remaining coordinate values of a counterpart are calculated in step S114. When the coordinate values are determined, the presence/absence of continuous input is determined in step S115. This determination is executed on the basis of a flag representing the presence/absence of continuous input.

If no continuous input is present (NO in step S115), the processing advances to step S117. If continuous input is present (YES in step S115), the processing advances to step S116.

In step S116, continuity is determined on the basis of, e.g., the difference from a coordinate value (e.g., a previous coordinate value) stored before then.

When continuity determination is done, a continuous input flag is set, and the current coordinate value is stored in the memory 132 for the next continuity determination in step S117.

In step S118, supplementary information such as an ID is added to each coordinate value. Especially, the same ID as that for a previous coordinate value is added to a coordinate value determined as having continuity. An unassigned ID is added to a newly detected coordinate value. If switch information and the like are available, these pieces of information are added, too.

The coordinate value having supplementary information is output to the external terminal in step S120. Then, the loop of data acquisition is repeated until power-off.

Details of processing in step S119 will be explained with reference to FIG. 25.

FIG. 25 is a flowchart showing details of processing in step S119 according to the embodiment of the present invention.

In step S202, the number of detected light-shielding ranges is checked to determine whether [NL1,NL2,NR1,NR2]= [1111]. If [NL1,NL2,NR1,NR2]=[1111] (YES in step S202), the processing advances to step S204. In this case, a pointer may be in the input transient state. If [NL1,NL2, NR1,NR2]≠[1111] (NO in step S202), the processing advances to step S203.

In step S203, it is determined whether each of the sensor units 1L and 1R detects a plurality of light-shielding ranges. For example, logical determination such as "(NL1≥2 or NL2≥2) and (NR1≥2 or NR2≥2)" is executed.

If the condition is true (YES in step S203), each of the sensor units 1L and 1R detects a plurality of light-shielding ranges, and it can be determined that no pointer is in the input transient state. In step S205, it is determined that a calculated coordinate value is valid, and an NG flag (NG_FLG flag) representing the validity/invalidity is set to 0. In step S119, it is determined that no pointer is in the input transient state. In FIG. 24, the processing advances to step S108.

If the condition is false (NO in step S203), the processing advances to step S204. In step S204, the maximum number of detected light-shielding ranges is compared with the number of pen-down pointers (pen-down count) to determine whether the pen-down count is equal to or larger than the maximum number of light-shielding ranges. If the pen-down count is equal to or larger than the maximum number of light-shielding ranges (YES in step S204), the processing advances to step S205.

If the pen-down count is smaller than the maximum number of light-shielding ranges (NO in step S204), the processing advances to step S206. In step S206, it is determined that a calculated coordinate value is not valid (a pointer is highly likely in the input transient state), and the NG_FLG flag is set to 1. In step S119, it is determined that a pointer is in the input transient state. In FIG. 24, the processing returns to step S102.

If the processing branches from step S202 to the determination in step S204, the maximum number of light-shielding ranges is 1. When the pen-down count is 1, it is determined that no pointer is in the input transient state, and the processing advances to step S205.

If the processing branches from step S203 to the determination in step S204, the maximum number of light-shielding ranges is 2. When the pen-down count is 2, it is determined that no pointer is in the input transient state. When, however, the pen-down count is smaller than 2, it is determined that a pointer is in the input transient state, and the processing advances to step S206.

In this fashion, the input transient state can be determined from the comparison between the number of light-shielding ranges and the pen-down count. In the input transient state, no wrong coordinate information is output.

In coordinate calculation using the end information of light-shielding ranges according to the embodiment, coordinate values can be calculated in an overlap state of a plurality of pointers. Hence, each sensor unit need not always have a plurality of light receiving units if the light receiving unit can implement coordinate calculation using the end information of light-shielding ranges, depending on the specifications of the system.

In the embodiment, light is projected toward the retroreflecting member 4, and a light-shielding range where the reflected light is shielded is detected. However, the retroreflecting member is not indispensable. The present invention can also be applied even when a continuous light emitting unit is provided around the coordinate input region.

In the embodiment, a line CCD is used as a light receiving element in a sensor unit. However, an area CCD sensor or CMOS sensor may be used. Especially, a CMOS sensor can read a specific part of an exposure area. Since no unnecessary area need be read, the read speed can be increased.

In the embodiment, on the basis of the light-shielding range detected by one of the plurality of light receiving units in each sensor unit, the read start position of the data of the other light receiving unit is determined. When only the data in the limited range is transferred to the memory, the operation speed of the entire system can be increased.

The coordinate input effective region 3 of the coordinate input apparatus is formed from, e.g., a large-screen display apparatus, and the coordinate values of pointers are displayed on the display screen. With this arrangement, an electronic whiteboard that allows simultaneous input by a plurality of persons can be implemented.

As described above, according to the embodiment, even when a plurality of coordinate points are input simultaneously by a plurality of pointers, any detection error in the input transient state can be prevented, and the positions of the plurality of pointers can be detected at a high accuracy.

The input transient state occurs when a pointer faces up or down, so the timing when pen-down information of the pointer is detected is important. If the light-shielding range detection timing shifts from the pen-down signal detection timing, the pen-down signal may not accurately reflect the pointer state depending on the system configuration.

For example, when a light-shielding range and pen-down signal are detected in the same period, one of them is detected first depending on their phase relationship. The state may change until the other is detected later.

To cope with such a situation, for example, when a pen-down signal is detected, a light-shielding range is detected within a practical time against the state change. The same effects can also be attained by detecting a pen-down signal upon detection of a light-shielding range.

When a light-shielding range and pen-down signal are detected asynchronously, they are detected a plurality of number of times in consideration of the system information delay. If the same results are detected, they may also be employed.

Assume that there is a delay of about $2\tau$ or less with respect to the light-shielding range detection period $\tau$. If three consecutive pieces of pen-down information exhibit the same value, the information is adopted for determination to compensate the timing difference.

If the delay is $\tau$ or less, it suffices to compare two detection results. When detection results are successively input, it is also possible to compare the current detection result with a previous one, and only when the detection result changes, execute detection a plurality of number of times.

Either or both of a light-shielding range and pen-down signal may be detected a plurality of number of times.

A determination error by a detection timing difference can, therefore, be prevented by detecting a light-shielding range and pen-down signal synchronously, or detecting them asynchronously and making determination on the basis of a plurality of detection results.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-225747 filed on Aug. 22, 2006, which is hereby incorporated by reference herein in its entirety.

What is claimed is:

1. A coordinate input apparatus for detecting a point position of a pointer on a coordinate input region, comprising:
   a plurality of sensor units which is provided at a periphery of the coordinate input region and receive incident light projected from a light projecting unit;
   a detection unit which detects light-shielding ranges of the incident light obtained from light amount distributions obtained from said plurality of sensor units upon a pointing operation of the pointer on the coordinate input region;
   a determination unit which determines that the pointer is in input transient state, where the pointer does not reach to an input surface of the coordinate input region, by detecting whether or not a number of pen-down signals, which indicate that the pointer contacts the input surface of the coordinate input region, obtained from the pointer is equal to the maximum number of light-shielding ranges in each of said plurality of sensor units, wherein a plurality of light-shielding ranges are obtained from each of said plurality of sensor units; and
   an execution unit which executes calculation of coordinate values corresponding to the light-shielding ranges on the basis of the number of light-shielding ranges when the determination unit determines that the pointer is not in the input transient state,
   wherein said execution unit controls whether to execute calculation of coordinate values corresponding to the light-shielding ranges, by executing detection of the pen-down signal a plurality of number of times on the basis of a detection period of said detection unit and a detection period of the pen-down signal, and comparing detection results.

2. The apparatus according to claim 1, further comprising a reflection unit which is provided at a periphery of the coordinate input region and retroreflects the incident light projected from said light projecting unit,
   wherein each of said plurality of sensor units comprises two, first and second light receiving units.

3. The apparatus according to claim 1, wherein the pointer comprises a signal generation unit which generates the pen-down signal.

4. The apparatus according to claim 1, further comprising a synchronization unit which synchronizes a detection timing of said detection unit and a detection timing of the pen-down signal.

5. A control method of a coordinate input apparatus which includes a plurality of sensor units, provided at a periphery of a coordinate input region, for receiving incident light, projected from a light projecting unit, and detects a point position of a pointer on the coordinate input region, the method comprising:
   a detection step of detecting light-shielding ranges of the incident light obtained from light amount distributions obtained from the plurality of sensor units upon a pointing operation of the pointer on the coordinate input region;
   a determination step of determining that the pointer is in input transient state, where the pointer does not reach to an input surface of the coordinate input region, by detecting whether or not a number of pen-down signals, which indicate that the pointer contacts the input surface of the coordinate input region, obtained from the pointer is equal to the maximum number of light-shielding ranges in each of said plurality of sensor units, wherein a plurality of light-shielding ranges are obtained from each of said plurality of sensor units; and
   an execution step of executing calculation of coordinate values corresponding to the light-shielding ranges on the basis of the number of light-shielding ranges when it is determined in the determination step that the pointer is not in the input transient state,
   wherein said execution step controls whether to execute calculation of coordinate values corresponding to the light-shielding ranges, by executing detection the pen-down signal a plurality of number of times on the basis of a detection period of said detection step and a detection period of the pen-down signal, and comparing detection results.

6. A computer program which is stored in a computer-readable medium and causes a computer to control a coordinate input apparatus that includes a plurality of sensor units, provided at a periphery of a coordinate input region, for receiving incident light, projected from a light projecting unit, and detects a point position of a pointer on the coordinate input region, the program causing the computer to execute:

a detection step of detecting light-shielding ranges of the incident light obtained from light amount distributions obtained from the plurality of sensor units upon a pointing operation of the pointer on the coordinate input region, a determination step of determining that the pointer is in input transient state, where the pointer does not reach to an input surface of the coordinate input region, by detecting whether or not a number of pen-down signals, which indicate that the pointer contacts the input surface of the coordinate input region, obtained from the pointer is equal to the maximum number of light-shielding ranges in each of said plurality of sensor units, wherein a plurality of light-shielding ranges are obtained from each of said plurality of sensor units; and an execution step of executing calculation of coordinate values corresponding to the light-shielding ranges on the basis of the number of light-shielding ranges when it is determined in the determination step that the pointer is not in the input transient state, wherein said execution step controls whether to execute calculation of coordinate values corresponding to the light-shielding ranges, by executing detection the pen-down signal a plurality of number of times on the basis of a detection period of said detection step and a detection period of the pen-down signal, and comparing detection results.

\* \* \* \* \*